United States Patent [19]

Ramakrishna et al.

[11] Patent Number: 5,072,405

[45] Date of Patent: Dec. 10, 1991

[54] RETE NETWORK WITH PROVISIONAL SATISFACTION OF NODE CONDITIONS

[75] Inventors: Kamesh Ramakrishna, Milford; Meyer Billmers, Lexington; Daniel Theriault, deceased, late of Leominster, all of Mass., by Michael J. Theriault, administrator

[73] Assignee: Digital Equipment Corporation, Maynard, Mass.

[21] Appl. No.: 668,738

[22] Filed: Mar. 13, 1991

Related U.S. Application Data

[62] Division of Ser. No. 537,025, Jul. 13, 1990, abandoned, which is a division of Ser. No. 264,696, Oct. 31, 1988, abandoned.

[51] Int. Cl.[5] .............................................. G06F 15/18
[52] U.S. Cl. ........................................................ 395/64
[58] Field of Search .......................................... 364/513

[56] References Cited

U.S. PATENT DOCUMENTS

| | | | |
|---|---|---|---|
| 4,761,746 | 8/1988 | Tano et al. | 364/513 |
| 4,849,905 | 7/1989 | Loeb et al. | 364/513 |
| 4,890,240 | 12/1989 | Loeb et al. | 364/513 |

*Primary Examiner*—Allen R. MacDonald
*Attorney, Agent, or Firm*—Kenyon & Kenyon

[57] ABSTRACT

An expression comprising conditions is evaluated based on values of data elements presented to a network of a kind in which the conditions are represented by nodes and the relationships among conditions in the expression are represented by links among the nodes, by storing information that identifies which conditions represented by at least some of the nodes have been satisfied by the values of the data elements, and testing the stored information in accordance with the expression as a basis for evaluating said expression. In a second aspect, an expression that comprises conditions which pertain to possible values of data belonging to categories of data is evaluated based on actual values of data presented to a network of a kind in which the conditions are represented by nodes, by identifying a category of data for which values need not occur in the network in order for a condition that requires a value in the category to be provisionally satisfied, and causing the node that represents the condition to indicate that the condition is provisionally satisfied even when no values in the identified category occur in the network.

20 Claims, 16 Drawing Sheets

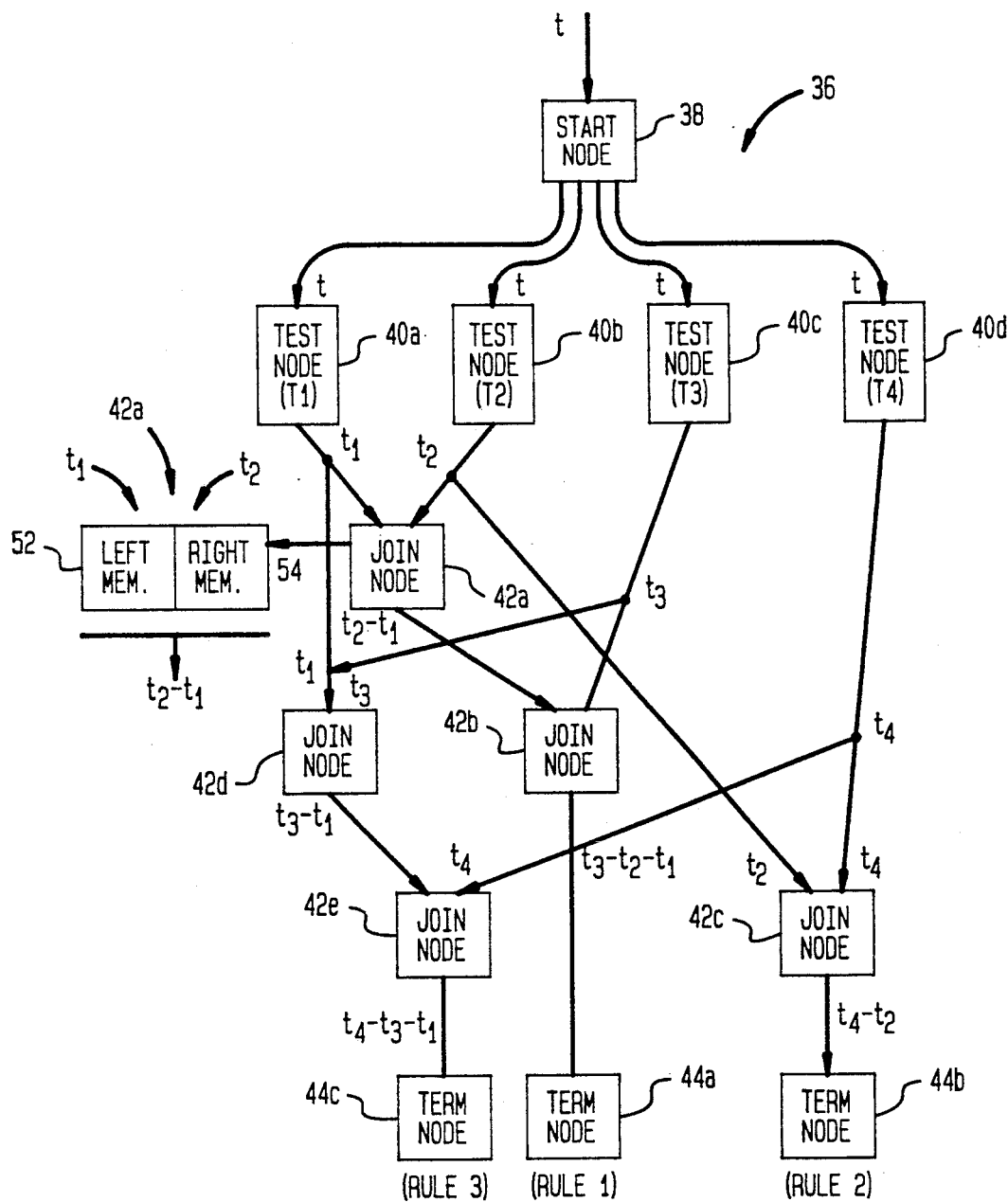

DATA STRUCTURE OF START MODE

DATA STRUCTURE OF TEST NODES

DATA STRUCTURE OF JOIN NODES

DATA STRUCTURE OF TERMINAL NODES

DATA STRUCTURE OF PRIMITIVE TOKENS

DATA STRUCTURE OF COMPLEX TOKENS

LEFT HAND SIDE  26'
RULE 4: (T1) AND [(T2) OR (T3) OR (T4) OR (T5)] ⟹
       22   24  22   24  22   24  22   24  22

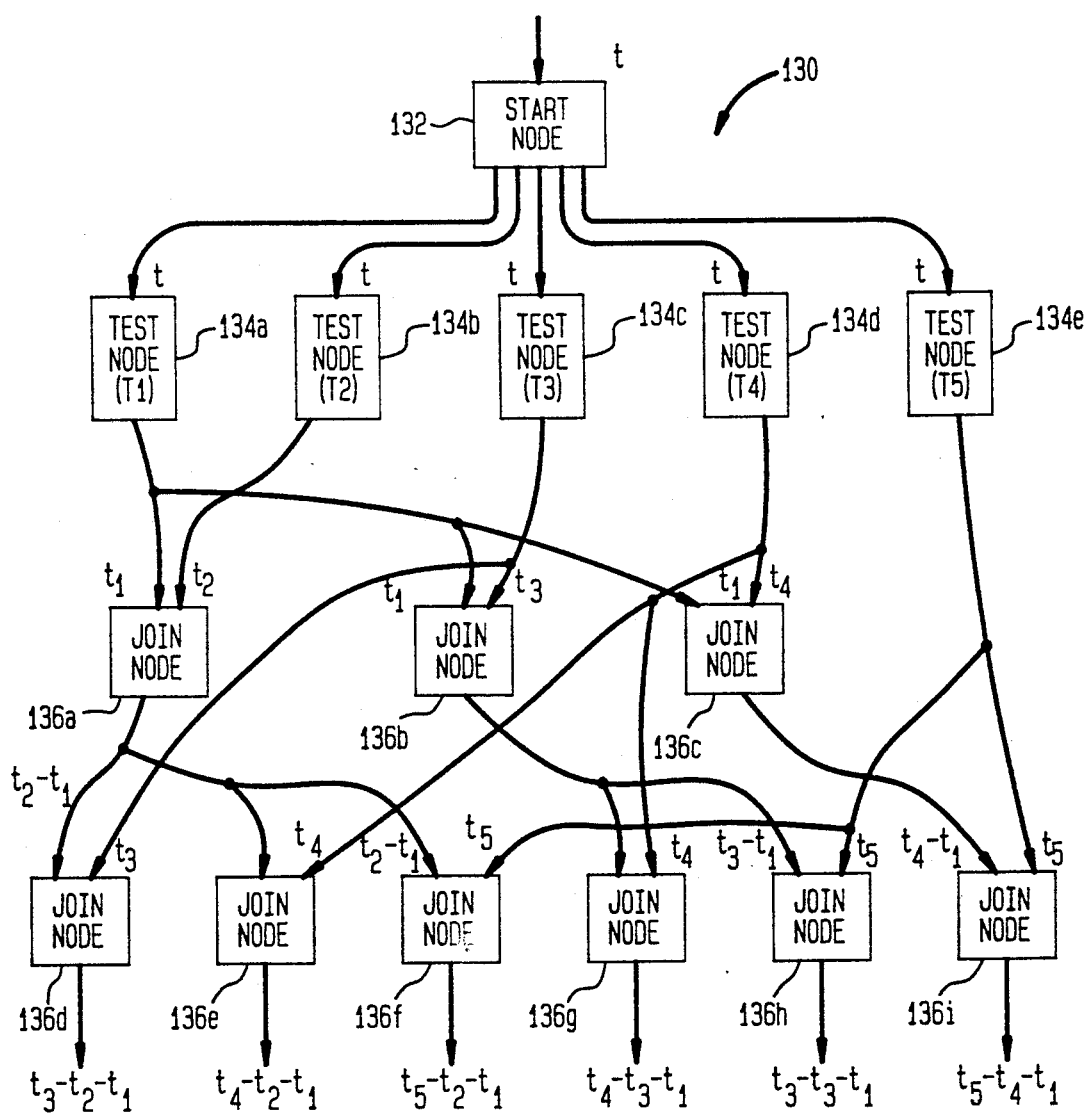

LEFT HAND SIDE 26'''

RULE 6: (T1) AND [AT MOST 2 OF (T2), (T3), (T4), (T5)] ⟹
         22    24    25'     22    22    22    22
                                                    (ACTION LIST 6)

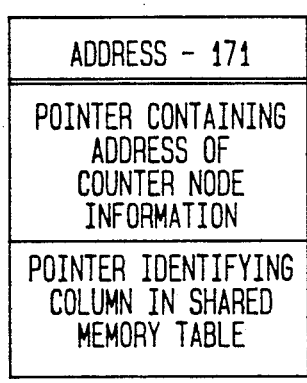

FIG. 17
DATA STRUCTURE OF RELAY NODE

| ADDRESS – 171 |
| POINTER CONTAINING ADDRESS OF COUNTER NODE INFORMATION — 172 |
| POINTER IDENTIFYING COLUMN IN SHARED MEMORY TABLE — 173 |

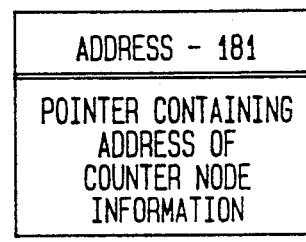

FIG. 18
DATA STRUCTURE OF COUNTER NODE

| ADDRESS – 181 |
| POINTER CONTAINING ADDRESS OF COUNTER NODE INFORMATION — 182 |

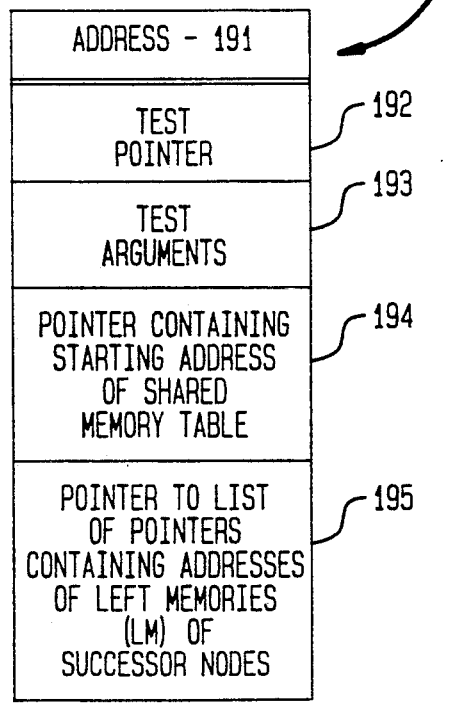

FIG. 19
DATA STRUCTURE OF COUNTER NODE INFORMATION

| ADDRESS – 191 |
| TEST POINTER — 192 |
| TEST ARGUMENTS — 193 |
| POINTER CONTAINING STARTING ADDRESS OF SHARED MEMORY TABLE — 194 |
| POINTER TO LIST OF POINTERS CONTAINING ADDRESSES OF LEFT MEMORIES (LM) OF SUCCESSOR NODES — 195 |

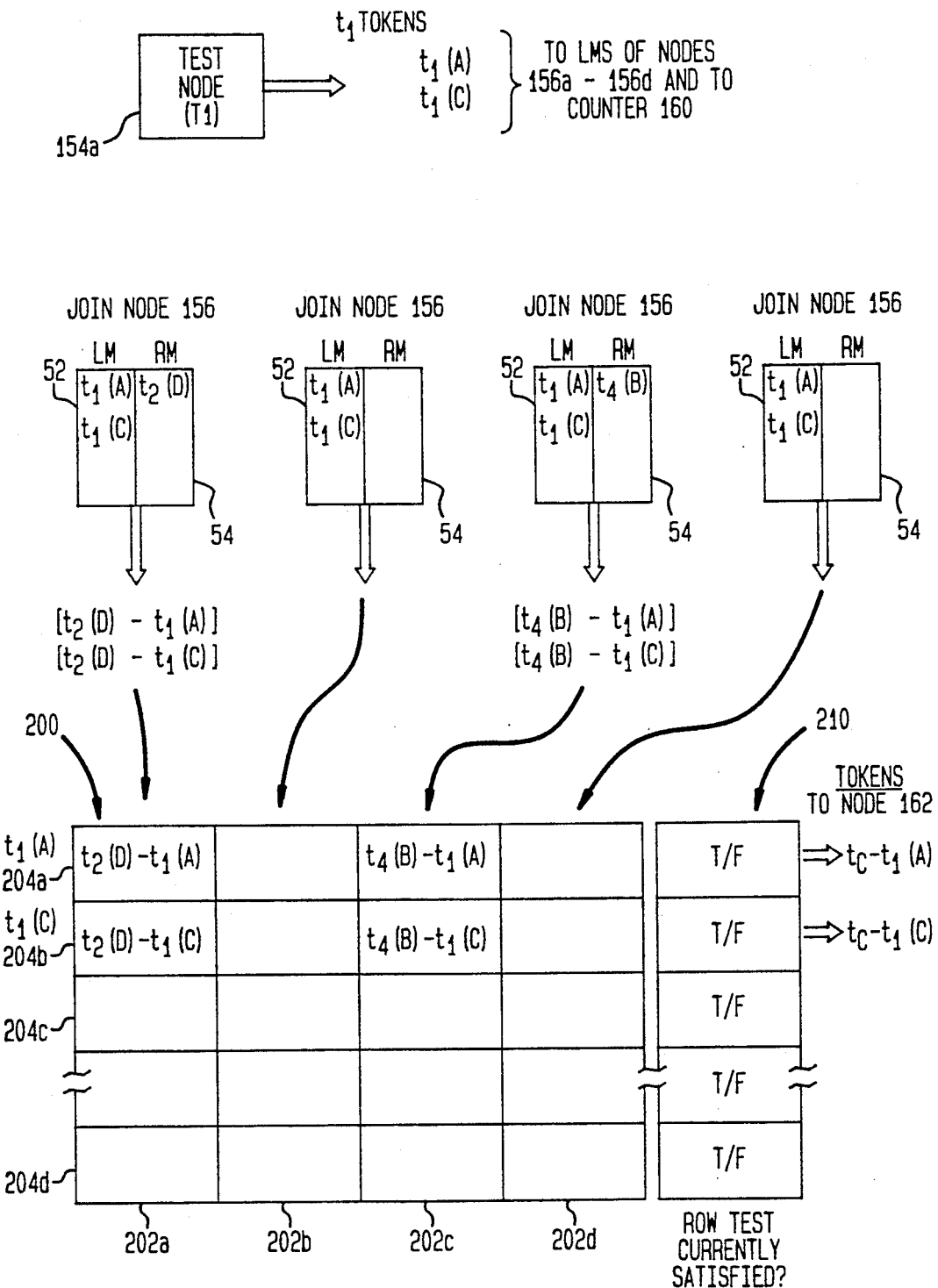

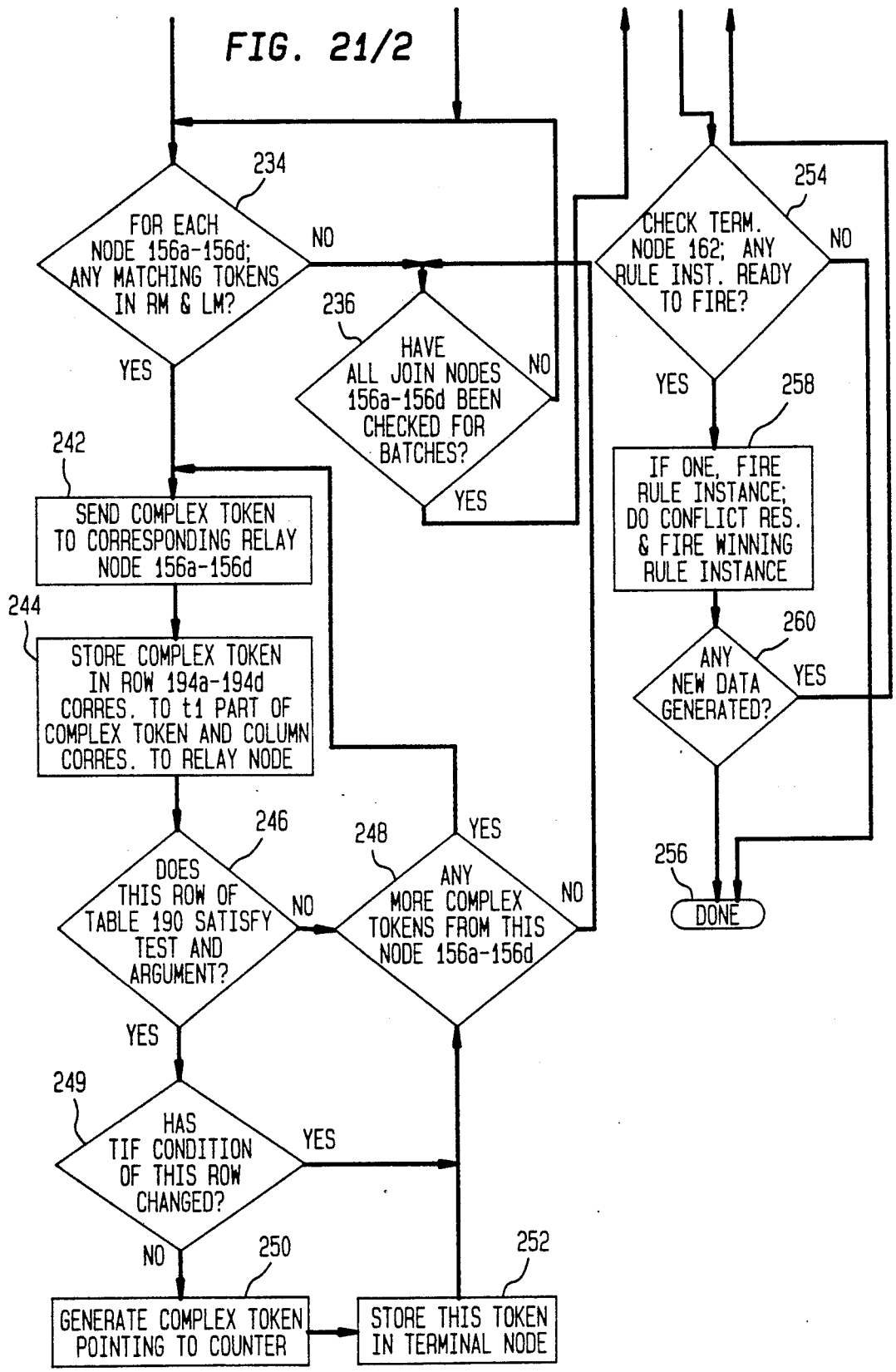
FIG. 21/2

FIG. 22

DATA DEFINITIONS ⎯14

| DATA CATEGORY | INITIAL VALUE | ALLOWED VALUE |
|---|---|---|
| NAME | X | (LIST OF NAMES) |
| AGE | <UNASKED> | <UNASKED> |
| HEIGHT | Y | GREATER THAN 1 LESS THAN 100 |
| WEIGHT | Z | BETWEEN 1 & 300 |

FIG. 23

RULE 7: [ (AGE=7) AND (HEIGHT<60) ] → [ACTION LIST 7]
           ⎵⎵⎵⎵  ⎵⎵⎵⎵⎵⎵⎵⎵          271
            T1         T2
        ⎵⎵⎵⎵⎵⎵⎵⎵⎵⎵⎵⎵⎵⎵⎵⎵
            LEFT-HAND SIDE 270

FIG. 24

RULE 7': [ (AGE=7; IF NOT, AGE <UNASKED>) AND (HEIGHT + 60) ] →
         ⎵⎵⎵⎵⎵⎵⎵⎵⎵⎵⎵⎵⎵⎵⎵⎵⎵⎵⎵⎵⎵  ⎵⎵⎵⎵⎵⎵⎵⎵⎵⎵⎵
                    T1'                        T2
         ⎵⎵⎵⎵⎵⎵⎵⎵⎵⎵⎵⎵⎵⎵⎵⎵⎵⎵⎵⎵⎵⎵⎵⎵⎵⎵⎵⎵⎵⎵⎵⎵
                LEFT-HAND SIDE          [ACTION LIST 7']
                         270'                     271'

RETE NETWORK WITH PROVISIONAL SATISFACTION OF NODE CONDITIONS

This application is a division of application Ser. No. 537,025, filed July 13, 1990, abandoned, which in turn is a division of application Ser. No. 264,696 filed Oct. 31, 1988, abandoned.

BACKGROUND OF THE INVENTION

This invention relates to rule-based artificial intelligence systems (i.e., so-called "expert systems") in which the various conditions defined by the rules are structured as a discrimination net to allow efficient determination of which rules are applicable to data obtained by the system.

An expert system is based on a computer program which comprises a set of rules and defines types of data that will be processed according to the rules. By a process known as "inference", the system performs matching between rules and data in a working data base that is obtained by the system from a user or from other data bases to determine which rules apply, and one or more of these rules is "fired" (i.e., applied to the data) to change the data in the working data base, provide advice to the user or explanations in response to the user's questions, or to take some other action. The inference process is repeated until no rules are found to be applicable to the data, or the firing of rules no longer produces a result.

Each rule includes one or more conditions (collectively referred to as the "left-hand side" of the rule) which, if satisfied by the data, indicate that the rule is applicable. The operations to be performed when the rule is fired are listed in the "right-hand side" of the rule. One way to determine which rules are applicable is to test every condition in the left hand sides of all of the rules each time a new element of data is obtained by the system. With this scheme, conditions that are found satisfied (or not satisfied) by data in the working data base are retested each time the working data base is altered by addition or deletion of data, even if the altered data could not possibly have changed the result of the test. Also, often the same condition is found in the left-hand side of more than one rule, and thus is tested multiple times whenever a new data element is obtained.

To avoid this, some expert systems structure the left-hand sides of the rules as a "discrimination net", such as a so-called "reticular" net or RETE-net. A RETE-net more efficiently determines which rules are applicable by testing, when the working data base is changed, only those conditions having results that may have changed in response to the changed data in the working data base. Also, RETE-nets cause conditions that are common to more than one rule to be tested only once each time the working data base changes.

A RETE-net is a data structure in which the conditions of all rules are arranged as a network of nodes. The conditions of the rules are identified by test nodes that are interconnected by a set of join nodes to represent the various combinations of conditions that are specified in the left-hand sides of the rules. A condition is represented by a single test node, even if that condition occurs in the left-hand sides of multiple rules. Tokens that represent data in the working data base are passed via the nodes through the RETE-net as the data pass various tests and combinations of tests. The RETE-net terminates at result nodes that each correspond to an individual rule. If the left-hand side of a rule is satisfied, the RETE-net stores a token in the result node corresponding to that rule.

RETE-nets work well when the combinations of conditions in the left-hand side of a rule are of the kind that can easily be represented as such a network of nodes. For example, a rule left-hand side that requires condition 1 AND condition 2 AND condition 3 AND condition 4 to be satisfied is represented with an AND node joining the test nodes for conditions 1 and 2, another AND node joining the first AND node and the condition 3 test node, and a third AND node joining the second AND node and the test node for condition 4.

It is often desirable that the left-hand side specify a more flexible combination of conditions, for example: condition 1 AND (at least 2 of: conditions 2, 3, 4, or 5). These types of combinations of conditions are called "meta-tests" and are typically represented by a complex set of nodes which join the condition 1 test node with permutations of the test nodes for conditions 2, 3, 4, and 5, and which terminate at several different result nodes.

It is possible that during an inference cycle the conditions of no rule will be satisfied, but one or more conditions are unsatisfied, not because data is incorrect but because data that would satisfy the condition is missing from the data base. The missing data must be identified and supplied in order to continue.

RETE-net-based expert system programs typically attempt to identify the missing data with special rules that cause the inference process to proceed in the reverse direction (i.e., "backward chaining"), or by asking the user a limited series of questions. In addition, the expert system program may be augmented with special rules (called "null condition" rules) that have conditions which are always satisfied and that are fired only if the left-hand side of no other rule is satisfied. The "actions" taken by null condition rules are selected to help the user recognize that data is needed and to provide a guide for identifying the missing data.

SUMMARY OF THE INVENTION

In one aspect of the invention, an expression comprising conditions is evaluated based on values of data elements presented to a network of a kind in which the conditions are represented by nodes and the relationships among conditions in the expression are represented by links among the nodes, by storing information that identifies which conditions represented by at least some of the nodes have been satisfied by the values of the data elements, and testing the stored information in accordance with the expression as a basis for evaluating said expression.

Preferred embodiments include the following features.

The information is stored in separate locations assigned to information from different nodes, and the information from each node is entered into the location assigned to that node. The expression is satisfied if a predetermined number of the conditions in the expression have been satisfied, and the number of locations that are occupied with information are counted to determine how many conditions have been satisfied.

In one embodiment, the expression includes an indexing condition represented by a node, and groups of the locations are established in storage based on information from the indexing condition node, with each group being associated with the data elements that satisfy the indexing condition. The information from the nodes identifies the data elements that satisfy the indexing condition and is entered in the locations of the group that corresponds to the identified data elements. The number of locations in each group that are occupied with information from the nodes are counted to determine whether the expression is satisfied.

Each group is monitored to determine whether the group currently has a count of occupied locations that indicates that the expression is satisfied. Occupied locations in a group are counted each time a new entry of information is made in that group.

The expression is indicated to be satisfied if a new entry of information causes a group that did not previously have a count of occupied locations that indicated satisfaction of the expression to have a count of occupied locations that indicates that the expression is satisfied. But the indication is not made if the group already had a count of occupied locations that satisfied the expression at the time that the new entry is made into the group.

Some nodes are adapted to cause the information to be deleted from corresponding occupied locations in storage, and the occupied locations in a group are counted each time that information is deleted from a location in that group. An indication is made that the expression is not satisfied if a deletion of information causes a group that previously had a count of occupied locations that satisfied the expression to have a count of occupied locations that does not satisfy the expression.

As a result, the network, which is preferably a discrimination net, such as a reticular net (i.e., a RETE-net), efficiently represent expressions, such a meta-tests, that are satisfied by a combination of some, but less than all, of the conditions in the expressions. Specific examples of these meta tests include expressions that are satisfied if any one of the conditions are satisfied, or if at least (or at most) a predetermined number of the conditions are satisfied. The network enables results of the evaluation to be available at a single location (e.g., in a terminal node in the RETE-net), thereby facilitating a determination of whether the expression is satisfied.

In a second aspect, the invention features evaluating an expression that comprises conditions which pertain to possible values of data belonging to categories of data based on actual values of data presented to a network of a kind in which the conditions are represented by nodes, by identifying a category of data for which values need not occur in the network in order for a condition that requires a value in the category to be provisionally satisfied, and causing the node that represents the condition to indicate that the condition is provisionally satisfied even when no values in the identified category occur in the network.

Preferred embodiments include the following features.

The category is identified by assigning to it a predetermined value, which is maintained until a value belonging to that category has occurred in the network. Each node having a condition that tests for a value in the identified category tests, if the condition is not satisfied, whether the category has the predetermined value and, if so, the node indicates that the condition is provisionally satisfied.

The expression is deemed to have been satisfied if a predetermined combination of nodes indicate that the conditions represented by the nodes are satisfied or are provisionally satisfied, and, if the expression is satisfied, the number of conditions that are indicated to be provisionally satisfied are identified. The expression is associated with a rule, and the rule is fired if the number of conditions that are indicated to be provisionally satisfied is zero.

Preferably, there are a plurality of expressions, each of which is satisfied if a predetermined combination of nodes indicate that the conditions in that expression are satisfied or are provisionally satisfied; for each expression that is satisfied, the number of conditions that are indicated to be provisionally satisfied is identified. Priority is determined between satisfied expressions based on the number of conditions that are indicated to be provisionally satisfied for each. The expressions are each associated with a rule, and one rule is selected based on the priority determination.

The selected rule is fired if the number of conditions that are indicated to be provisionally satisfied for the satisfied expression that is associated with the selected rule equals zero. On the other hand, if the number of conditions that are indicated to be provisionally satisfied is more than zero, the identified category of data for which no values occur in the network is selected, and a value for the selected category of data is obtained.

As a result, categories for which data are missing are efficiently identified by a mechanism that is invisible to the user. No special rules, null condition rules, or backward chaining is required. Thus, the missing data can easily be retrieved, either by the user or by running a separate program.

Other features and advantages of the invention will be apparent from the following detailed description, and from the claims.

DESCRIPTION OF THE PREFERRED EMBODIMENT

We first briefly describe the drawings.

FIG. 2 is a diagram representative of rules used in the system of FIG. 1.

FIG. 3 is a diagram of a reticular net (i.e., a RETE-net) representation of the rules of FIG. 2.

FIG. 12 is a diagram of an "at least" rule.

FIG. 13 is a diagram of a conventional RETE-net for the "at least" of rule of FIG. 12.

FIG. 17 is the data structure of one of the nodes in the RETE-net of FIG. 16.

FIG. 18 is the data structure of another one of the nodes in the RETE-net of FIG. 16.

FIG. 19 is a data structure of information that is shared by the nodes of FIGS. 17 and 18.

FIG. 20 is a diagram useful in understanding the operation of the RETE-net of FIG. 16.

FIG. 22 is a diagram of data definitions.

FIG. 23 is a diagram of a representative rule.

FIG. 24 is a diagram of the rule of FIG. 23 modified according to a second aspect of the invention.

STRUCTURE AND OPERATION

Figure 1:
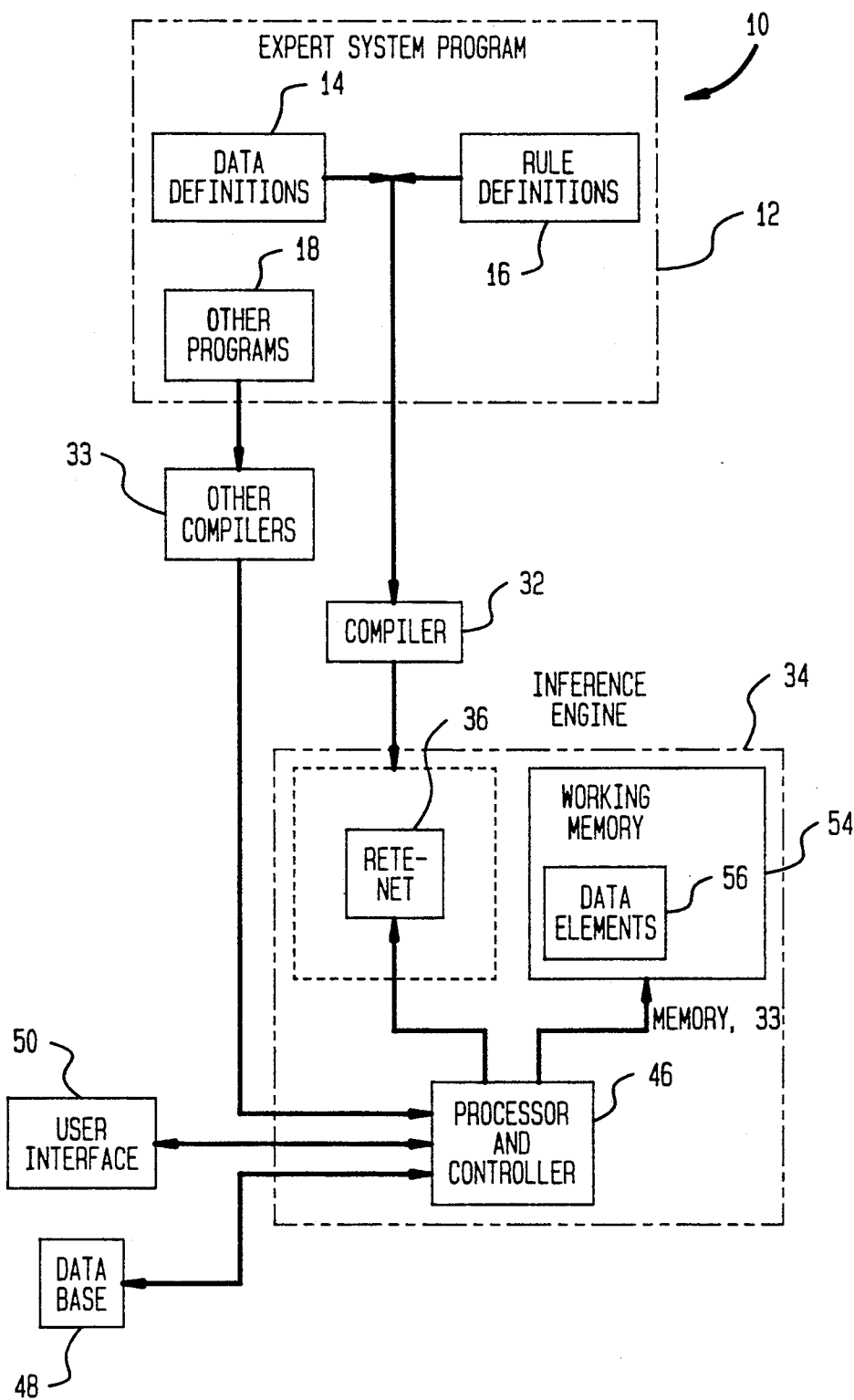
FIG. 1 is a functional block diagram of an expert system.

Referring to FIG. 1, expert system 10 executes an expert system program 12 created using any suitable expert system programming language (such as OPS5, available from Digital Equipment Corporation). Expert system program 12 includes a set of data definitions 14 that identify categories of data which program 12 will use during operation. For example, if program 12 is to be used with data concerning people, data definitions 14 might include categories such as name, age, sex, height, and weight. Program 12 also includes a set of rules, described by rule definitions 16, for manipulating actual data that fit definitions 14 and that are obtained by system 10. Expert system program 12 also includes links to programs 18 in other languages (such as C, Fortran, Basic, etc.) for performing tasks (e.g., accessing remote databases, making statistical computations) when called upon during the execution of expert system program 12.

Referring to FIG. 2, a set of rules 20 (e.g., rules 1-3) described by rule definitions 16 each includes one or more conditions or tests 22 (e.g., tests T1-T4) that are joined by test connectors 24 (e.g., "ANDs") to form an expression known as the left hand side 26 of the rule. A rule 20 is applicable to the data obtained by system 10 only if the data satisfies the expression of tests 22, 24 in the left hand side 26 of that rule. For example, rule 1 is applicable only if the data passes tests T1, T2, and T3 (i.e., only if tests T1-T3 are all "true"). Test T2 is also in the left-hand side 26 of rule 2 and must be true along with test T4 for rule 2 to be applicable. Similarly, tests T1, T3, and T4 all must be true for left-hand side 26 of rule 3 to be satisfied.

The right hand side 28 of each rule 20 contains an "action list" 30 that is executed if the rule is fired. For example, the firing of a rule might cause system 10 to obtain more data or compute the value of some data (for example, by executing one of other programs 18). A rule firing may also cause some external action to be taken (such as displaying data or changing an external database 48).

Referring again to FIG. 1, data definitions 14 and rule definitions 16 are compiled by a compiler 32 in a manner described in detail below and stored in a memory 33 of an inference engine 34 as a type of discrimination net data structure known as a reticular net 36 (i.e., a RETE-net). (The other programs 18 are compiled by their own compilers 33 and applied to processor and controller 46 in inference engine 34.)

Referring also to FIG. 3, in RETE-net 36 the distinctions between the left-hand sides of individual rules 20 (FIG. 2) are eliminated, and the individual tests T1-T4 are each represented by a single test node 40a-40d, respectively, regardless of how many rules the tests 22 appear in. For example, test T1 is represented by a single test node 40a, even though test T1 appears in the left-hand sides 26 of both rules 1 and 3.

Test nodes 40a-40d are fed by a common start node 38 in a manner described in detail below. The outputs of test nodes 40a-40d are interconnected through a set of join nodes 42a-42e to a set of result or terminal nodes 44a-44c. Join nodes 42a-42e represent the function (in this case, "ANDs") of the test connectors 24 in the left-hand sides 26 of rules 20 (FIG. 2).

Each terminal node 44a-44c is associated with the left-hand side 26 of one of rules 20. Thus, the path from start node 38 through test nodes 40a-44c represents the test expression in the left-hand side 26 of one of rules 20. For example, the outputs of test nodes 40a and 40b are interconnected by AND join node 42a, the output of which is in turn interconnected with the output of test node 40c in AND join node 42b. The result, applied to terminal node 44a, represents the test expression [(T1) AND (T2) AND (T3)] which comprises the left-hand side 26 of rule 1.

Similarly, the outputs of test nodes 40b and 40d are combined in AND join node 42c and the result applied to terminal node 44b as a representation of the expression [(T2) AND (T4)] specified in the left-hand side 26 of rule 2. Finally, the expression in the left-hand side of rule 3, namely [(T1) AND (T3) AND (T4)], is represented in RETE-net 36 by the interconnection of the outputs of test nodes 40a and 40c with AND join node 42d, the output of which is joined with the output of test node 40d in AND join node 42e and applied to terminal node 44c.

Additionally, each terminal node 44a-44c identifies the action list 30 of the rule with which the terminal node is associated. For example, terminal node 44a identifies the action list 30 of rule 1.

A processor/controller 46 in inference engine 34 obtains working data in a variety of ways, for example, from data base 48 or the user via a user interface 50, by performing initial computations specified by data definitions 14, or by executing right hand sides 28 of rules 20 (FIG. 2). Processor/controller 46 stores this data in a working memory 54 as a set of data elements 56. A data element 56 identifies one or more data definitions and a value for each definition. For example, a data element 56 could comprise one category (e.g., age) and an associated value, or a number of categories (e.g., name, age, height, sex, and weight) and a data value for each category.

In operation, whenever new data elements 56 are stored in working memory 54, processor/controller 46 creates "add" tokens for them and applies the tokens one at a time to RETE-net 36, which processes the tokens to determine if one or more rules 20 are applicable to the data stored in working memory 54. This process is known as "matching" and is described in detail below. If multiple rules 20 are applicable, or if a single rule is applicable to more than one combination of data elements, processor/controller 46 performs conflict resolution to select one or more of such rule "instances", and fires those rule instances.

The firing of a rule instance may cause several results. For example, it may create new data or cause processor/controller 46 to calculate a new value for existing data or to obtain more data, either from data base 48 or from the user via interface 50. Processor/controller 46 stores any newly acquired data as elements 56 in working memory 54, creates add tokens for these new data elements, and applies the new add tokens to RETE-net 36 in another inference cycle to find a rule instance for firing. Similarly, if a data value is changed during operation, processor/controller 46 applies a "delete" token representing the old data value to RETE-net 36, and then applies an "add" token for the new data value. This process continues until no applicable rules are identified or until no new data elements 56 are generated or obtained as the result of firing the rules.

During operation, processor/controller 46, via interface 50, can provide advice to the user or explanations to questions from the user. Processor/controller 46 can also take other actions, such as executing one or more of programs 18 or displaying data to the user.

In FIG. 3, processor/controller 46 applies add or delete tokens t representing data elements 56 (called primitive tokens) to start node 38, and then in turn to test nodes 40a–40d. Processor/controller 46 performs the test identified by each test node 40a–40d on the data associated with the primitive token t and, if the test passes, processor/controller 46 sends the primitive token to the appropriate join node or nodes 42a–42e. The primitive tokens that are sent from test nodes 40a–40d are designated $t_1-t_4$, respectively, in FIG. 3, although they are identical to the token t.

Each join node 42a–42e (e.g., AND join node 42a, shown in detail in FIG. 3) includes a pair of memories, one each for the nodes from which the join node receives tokens. Thus, join node 42a includes left memory 52 for receiving and storing tokens $t_1$ from test node 40a, and a right memory 54 to receive and store tokens $t_2$ from test node 40b.

Processor/controller 46 attempts to match tokens in the left and right memories 52, 54 of each join node 42a–42e according to the function of the join node. Join nodes define a wide variety of possible functions that correspond to the functions of the test connectors 26 in the rules (FIG. 2). For example, join nodes can specify a simple logical ANDing of tokens in left memory 52 with tokens in right memory 54. (This is in fact the function of join nodes 42a–42e.) Alternatively, a join node (called a NOT join node) can specify a check for the absence of tokens in right memory 54 in conjunction with the presence of tokens in left memory 52. Join nodes can also identify tests on the data elements associated with the input tokens to allow processor/controller 46 to determine, for example, whether a data element associated with one token is equal to, not equal to, less than, greater than, less than or equal to, or greater than or equal to the data element associated with the other token. The programmer can also specify other tests to be performed by processor/controller 46 on the data elements at the join nodes.

In any of these types of join nodes, when a token match is found, processor/controller 46 generates a new token, called a complex token, which identifies which tokens (and hence which data elements) were matched at the join node. Processor/controller 46 sends the complex token to the next node in RETE-net 36. Like primitive tokens, complex tokens can be add tokens or delete tokens. Consider, for example, applying add token t associated with data element A to RETE-net 36 at a time when one add token $t_2$ (associated with data element B that has passed test T2) already resides in right memory 54 of AND join node 42a. If data element A passes test T1, processor/controller 46 sends the token (labelled $t_1$ in FIG. 3) from node 40a to left memory 52 of AND join node 42a. Because add tokens are present in left and right memories 52, 54, the AND function of join node 42a is satisfied, and processor/controller 46 generates a complex add token $t_2-t_1$, and sends the complex token from node 42a to the left memory 52 of join node 42b.

Complex token $t_2-t_1$ identifies both primitive tokens $t_1$ and $t_2$ and thus also identifies data elements A, B that have passed test T1 and T2 and have satisfied the function of join node 42a.

Continuing, suppose data element C subsequently obtained by inference engine 34 satisfies test T3. Processor/controller 46 sends an add token $t_3$ which represents data element C from test node 40c to right memory 54 of AND join node 42b. A match thus exists between primitive token $t_3$ and the $t_2-t_1$ complex token already stored in left memory 52 of node 42b. Processor/controller 46 produces another complex add token, $t_3-t_2-t_1$, identifying primitive tokens $t_3$, $t_2$, $t_1$, (and thus data elements C, B, and A, respectively).

Complex add token $t_3-t_2-t_1$ is stored by processor/controller 46 in terminal node 44a and indicates that the left-hand side 26 of rule 1 is satisfied. Similarly, whenever the processing of a new data element 56 causes the left-hand side 26 of rule 2 to be satisfied, processor/controller 46 stores a complex add token $t_4-t_2$ in terminal node 44b from join node 46c. Also, when tests T1, T3, and T4 in the left-hand side of rule 3 are satisfied, complex add token $t_4-t_3-t_1$ is stored in terminal node 44c from join node 42e by processor/controller 46.

After tokens representing all of the data elements 56 have been applied to RETE-net 36, processor/controller 46 checks terminal nodes 44a–44c to determine which rule left-hand sides 26 are satisfied, and which data elements satisfy the left-hand side or sides. It is possible that the left-hand sides 26 of multiple rules 20 (e.g., rules 1 and 2) are satisfied. It is also possible that the left-hand side 26 of a single rule (e.g., rule 1) is satisfied by more than one combination of data elements 56. For example, if test T3 is also satisfied by data element D, a pair of complex $t_3-t_2-t_1$ add tokens identifying data elements D, B, and A and data elements C, B, and A, respectively, will be present at terminal node 44a.

Each combination of data elements 56 that satisfies a rule left-hand side 26 identifies an "instance" of the rule 1, that is, defines a set of data elements 56 for which a rule is applicable. Inference engine 34 performs conflict resolution between multiple instances of rules to determine which one or more instances of which rule or rules to fire. When an instance of a rule (e.g., rule 1) is fired, processor/controller 46 marks as deleted the complex add token in the terminal node (e.g., token $t_3-t_2-t_1$ (for data elements C, B, A) in node 44a) associated with that instance, so that this rule is not considered satisfied again until another complex token is stored in node 44a (or unless more than one complex token was stored in node 44a when rule 1 was fired).

Figure 4:
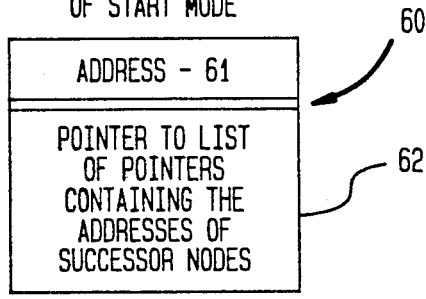
FIG. 4 is a data structure of one type of node in the RETE-net.

Referring to FIGS. 4–7, start node 38, test nodes 40a–40d, join nodes 42a–42e, and terminal nodes 44a–44c are defined by data structures 60, 70, 80, and 90, respectively, stored in inference engine 34. The data structure 60 of start node 38 is shown in FIG. 4 and includes a field 62 which holds a pointer to a list of pointers which contain the addresses of successor nodes in RETE-net 36, that is, the addresses 71 (FIG. 5) of test nodes 40a–40d.

Figure 5:
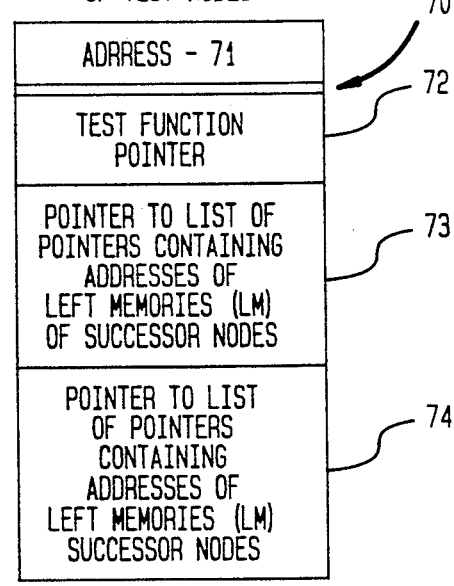
FIG. 5 is a data structure of a second type of node in the RETE-net.

Referring to FIG. 5, the data structure 70 of test nodes 40a–40d includes field 72 which is a pointer that contains the memory address of the test assigned to the test node (i.e., test T1 for node 40a). Field 73 contains a pointer to a list of pointers that hold the addresses of the left memories 52 (FIG. 3) of the node or nodes to which tokens are sent from the test node 40a–40d. For example, field 73 for test node 40b holds a pointer to a list containing a pointer that holds the address of left memory (LM) 52 of join node 42c. Field 74 holds a pointer to a list of pointers that contain the addresses of the right memories 54 of the successor node or nodes to which tokens are sent. For example, field 74 for test node 40b holds a list that comprises a pointer to a list that comprises a pointer that contains the address of right memory (RM) 54 of join node 42a.

Figure 6:
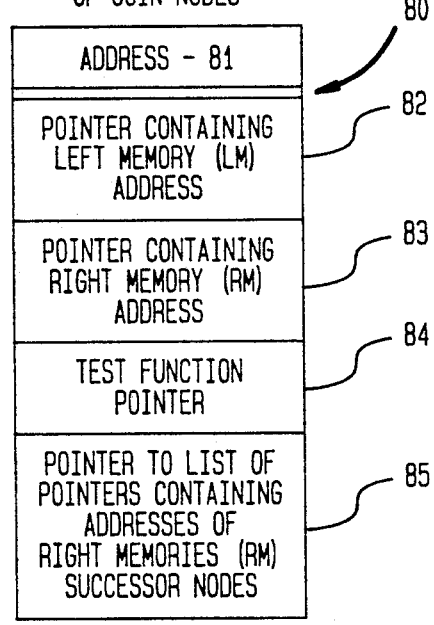
FIG. 6 is the data structure of a third type of node in the RETE-net.

Referring to FIG. 6, the data structure 80 of join nodes 42a–42e includes a field 82 that contains a pointer to the address of the left memory (LM) 52 of the join node, and a pointer to the right memory (RM) 54 address of the node is held in field 83. A pointer in field 84 designates the location in the memory 33 of inference engine 34 of the test (e.g., equal to, not equal to, less than, greater than, less than or equal to, greater than or equal to, or don't care) and logical function (e.g., AND or NOT) identified by the node to match left memory and right memory tokens. Unlike tokens from test nodes 40a–40d, tokens are passed from join nodes 42a–42e only to left memories 52 of successor nodes. Field 85 contains a pointer to a list of pointers that contain these left memory addresses. For example, field 85 in the data structure 80 of join node 42a contains a pointer to the address of the left memory 52 of join node 42b.

Figure 7:
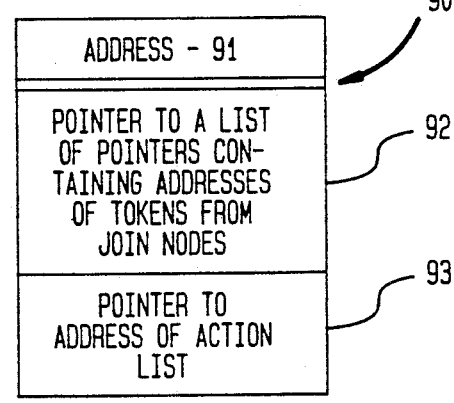
FIG. 7 is a data structure of a fourth type of node in the RETE-net.

Referring to FIG. 7, the data structure 90 for teminal nodes 44a–44c includes a field 92 that contains a pointer to a list of pointers that contain the locations in the memory 33 of inference engine 34 where one or more complex tokens received from the join nodes are stored. For example, field 92 for node 44a contains a pointer to a location in memory where complex tokens $t_3$-$t_2$-$t_1$ from join node 42b are stored. The addresses 91 of terminal nodes 44a–44c are identified by pointers in fields 85 of the data structures 80 of join nodes 42b, 42c, 42e, respectively. Field 93 contains a pointer to the location in inference engine memory 33 in which the action list 30 of the rule identified by the terminal node 44a–44c is stored.

Figure 8:
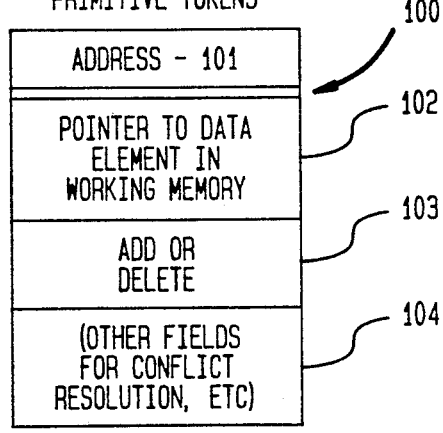
FIG. 8 is the data structure of a primitive token used in the RETE-net.

Referring to FIG. 8, the data structure 100 of a primitive token includes field 102 that holds a pointer to the location in working memory 54 at which the data element 56 associated with that primitive token is stored. For example, field 102 in the data structure of a primitive token t associated with data element A holds a pointer to the location in working memory 54 at which element A is stored. If data element A passes test T1, for example, the primitive token $t_1$ sent by processor/controller 46 to left memory 52 of join node 42a has the same address 101 as token t and also holds a pointer in field 102 to the location of data element A.

Primitive token data structure 100 also includes a field 103 which indicates whether the token is an add token or a delete token. An add token augments the token list in a node or nodes to which the token is applied in the manner discussed above. On the other hand, a delete token subtracts a token from the left memory 52 or the right memory 54 of the successor node or nodes.

The other fields 104 in primitive token data structure 100 contain pointers to stored sequences in inference engine memory 33 that are used, for example, to resolve conflicts between multiple instances of rules 20 (i.e., between multiple rules 20 that have their left-hand sides 26 satisfied and between multiple instances of a single rule that are satisfied).

Figure 9:
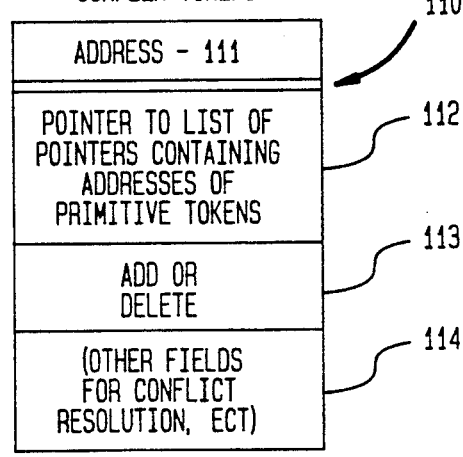
FIG. 9 is the data structure of a complex token used in the RETE-net.

Referring to FIG. 9, the data structure 110 of complex tokens (e.g., token $t_2$-$t_1$ produced by join node 42a) includes a field 112 that contains a pointer to a list of pointers that contain the addresses of the tokens from which the complex token is formed. When a match exists between, for example, primitive tokens $t_1$ and $t_2$ (pointing to data elements A and B, respectively) stored in left and right memories 52, 54 of join node 46a, the complex token $t_2$-$t_1$ that is created by processor/controller 46 includes a pointer in field 112 to a list that includes two pointers that hold the respective addresses 101 of primitive tokens $t_2$, $t_1$. Similarly, the data structure 110 of complex token $t_3$-$t_2$-$t_1$ produced at join node 42b includes a pointer in field 112 to a list that comprises a pair of pointers that hold the address 101 of token $t_3$ and the address 111 of complex token $t_2$-$t_1$, respectively.

Thus, the data elements (i.e., the data definitions and their respective data values) associated with a complex token are found by following the pointer list associated with field 112 until the addresses 101 of all of the primitive tokens are found, and then following the pointers in fields 102 of the primitive tokens to the locations in working memory 54 of the data elements 56 which the primitive tokens represent.

Complex token data structure 110 also includes an add/delete field 113 and other fields 114 for pointers to conflict resolution sequences and other functions associated with the token.

Referring again to FIGS. 2 and 3, RETE-net 36 provides an efficient representation for rules 20 which, like rules 1-3, simply require that all of the conditions in the left hand side of the rule be satisfied (i.e., rules that contain only AND and NOT test connectors 24). There are other rules, however, whose left-hand sides define test expressions that are satisfied when some, but less than all of the tests in the left-hand side are passed. These combinations of tests are known as "meta-tests".

Figures 10, 11:
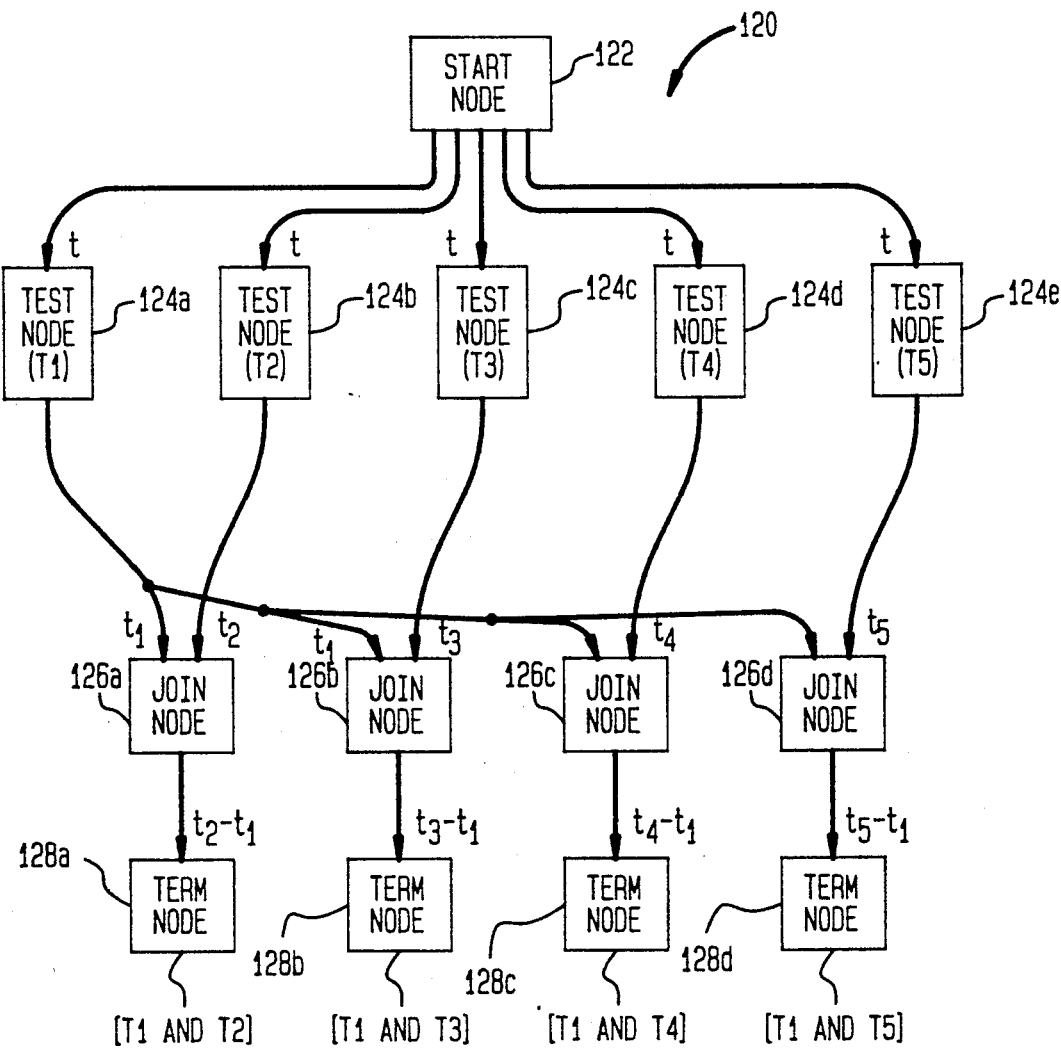
FIG. 10 is a diagram of an "OR" rule.
FIG. 11 is a diagram of a conventional RETE-net for the "OR" rule of FIG. 10.

Referring to FIGS. 10 and 11, in one type of meta test the test expression in the left-hand side 26' of the rule (e.g., rule 4) includes logical OR test connectors 24' between individual tests T2-T5. The left-hand side of Rule 4 is satisfied if tests T1 and T2 pass, or if tests T1 and T3 pass, or if tests T1 and T4 pass, or if tests T1 and T5 pass. The RETE-net representation 120 for rule 4 is shown in FIG. 11. Processor/controller 46 performs the tests T1–T5 identified by nodes 124a–124e, respectively, on data elements 56 associated with primitive tokens passed from start node 122. Because test T1 must pass if left-hand side 26' is to be satisfied, processor/controller 46 applies primitive token $t_1$ to the left memories 52 (FIG. 3) of all join nodes 126a–126b.

Primitive tokens $t_2$-$t_5$ are sent to the right memories of join nodes 126a–126d, respectively, when corresponding tests T2-T5 pass. Processor/controller 46 produces complex tokens $t_2$-$t_1$, $t_3$-$t_1$, $t_4$-$t_1$, $t_5$-$t_1$ at join nodes 126a–126d, respectively, when token matches occur. Because the occurrence of any one of these four complex tokens results in an instance of rule 4, processor/controller 46 must examine each complex token, either elsewhere in RETE-net 36 or in four different terminal nodes 128a-128d. Also, if one instance of rule 4 is fired (e.g., because T1 and T2 are passed) other instances of the rule must be prevented from firing.

Referring to FIGS. 12 and 13, another type of meta test is used with an "at least" rule. For example, the test expression of the left hand-side 26" of rule 5 is satisfied if test T1 and at least two of tests T2-T5 are passed. The expression "at least 2 of" in left-hand side 26" is a test connector 25 that is not easily represented by a RETE-net. One RETE-net representation 130 for left-hand side 26" is shown in FIG. 13 and requires nine join nodes 136a-136i to combine the tokens $t_1$-$t_5$ produced by test nodes 134a-134e. RETE-net 130 produces six complex tokens ($t_3$-$t_2$-$t_1$, $t_4$-$t_2$-$t_1$, $t_5$-$t_2$-$t_1$, $t_4$-$t_3$-$t_1$, $t_5$-$t_3$-$t_1$, $t_5$-$t_4$-$t_1$), the presence of any one of which indicates that the left-hand side 26" of rule 5 is satisfied.

Figures 14, 16:
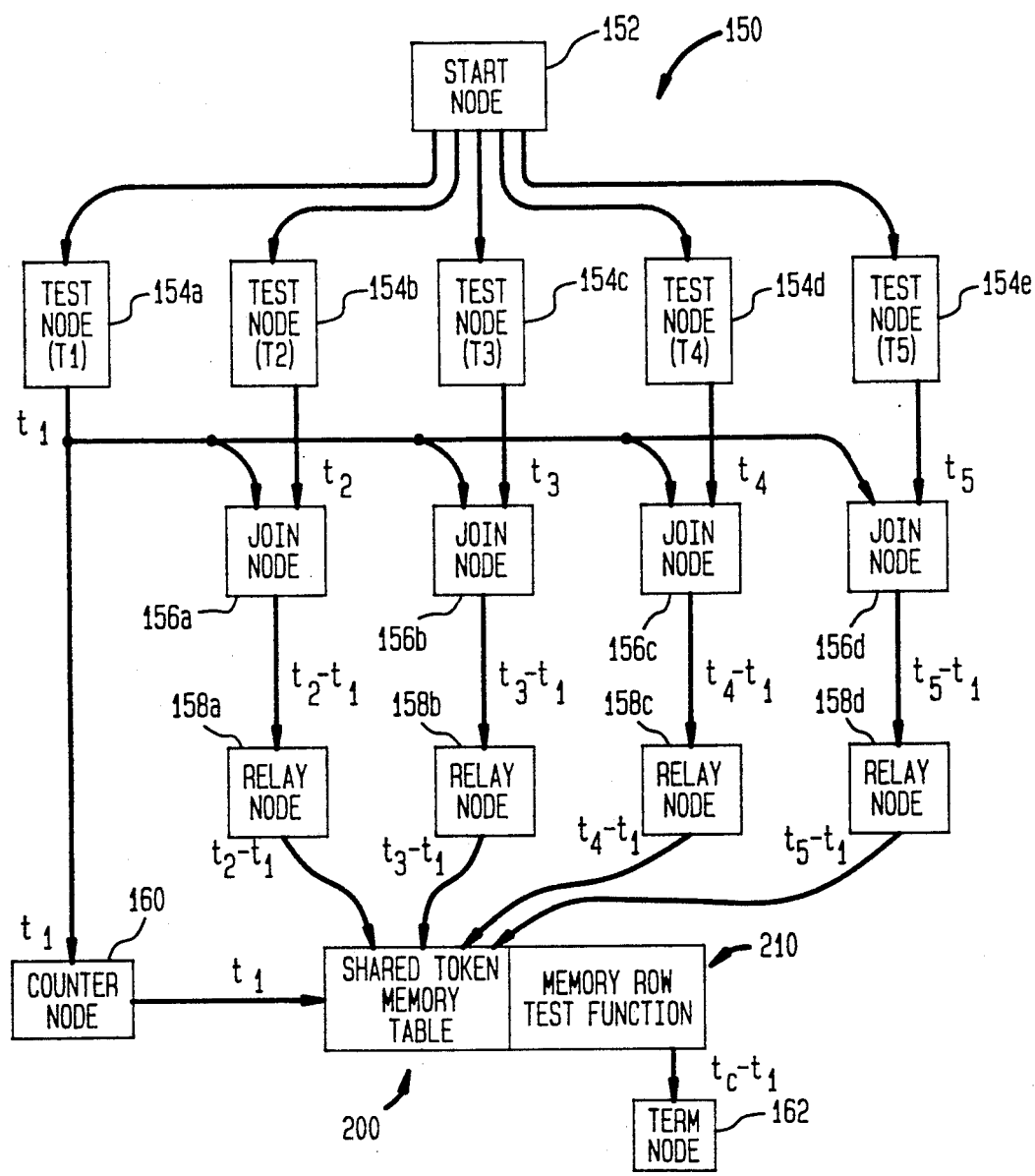
FIG. 14 is a diagram of an "at most" rule.
FIG. 16 is a RETE-net for the rules of FIGS. 10, 12, and 14 according to one aspect of the invention.
Figure 15:
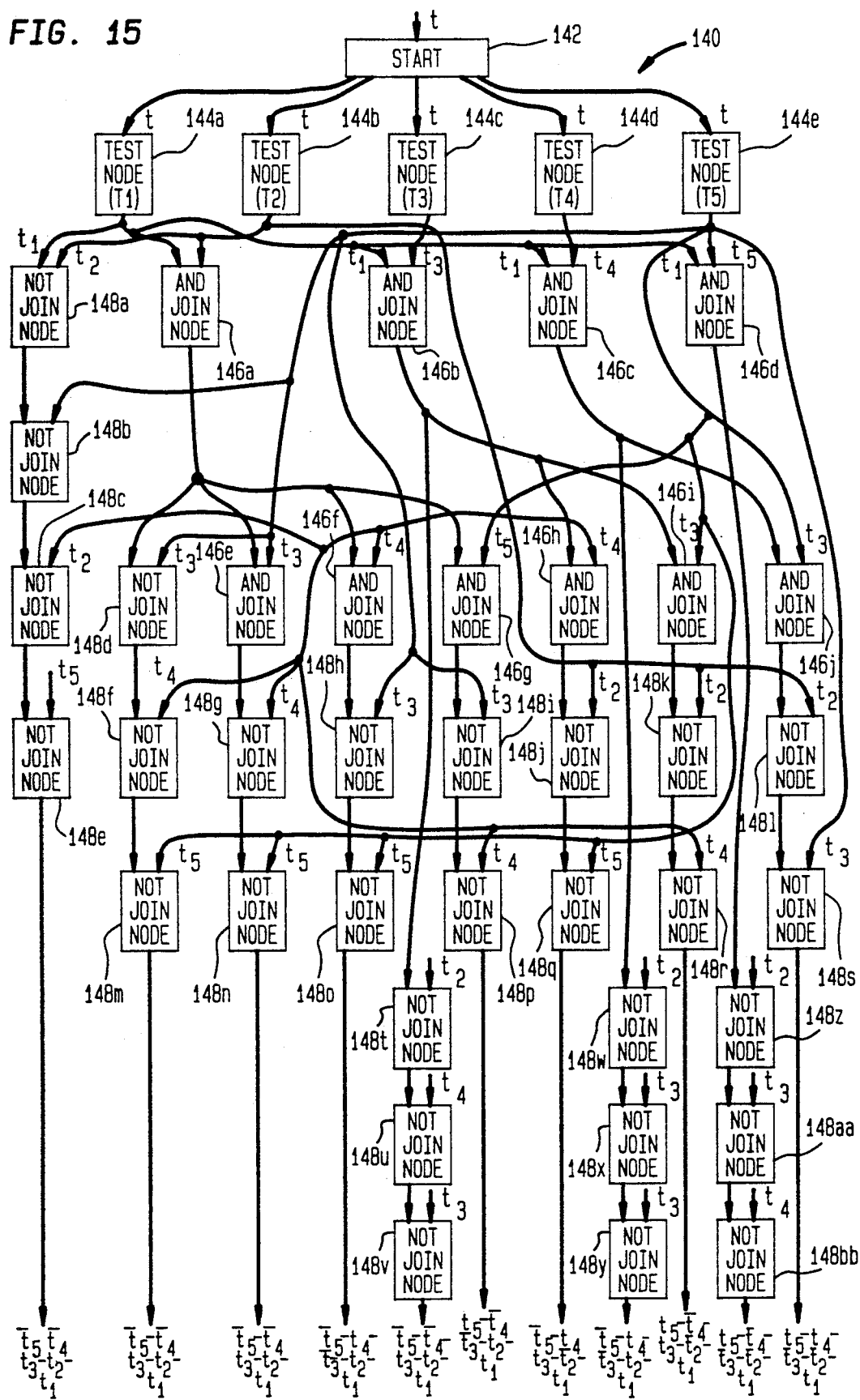
FIG. 15 is a diagram of a conventional RETE-net for the "at most" rule of FIG. 14.

Referring to FIGS. 14 and 15, yet another type of meta-test is performed for an "at most" rule such as rule 6, which limits the number of tests in the left hand side 26''' that can pass if the rule is eligible for firing. Thus, left-hand side 26''' of rule 6 is satisfied only by the following logical combination of tests T1-T5:

| | | | | |
|---|---|---|---|---|
| not T5 | not T4 | not T3 | not T2 | T1 |
| not T5 | not T4 | not T3 | T2 | T1 |
| not T5 | not T4 | T3 | T2 | T1 |
| not T5 | T4 | not T3 | T2 | T1 |
| not T5 | not T4 | T3 | not T2 | T1 |
| T5 | not T4 | not T3 | T2 | T1 |
| not T5 | T4 | T3 | not T2 | T1 |
| not T5 | T4 | not T3 | not T2 | T1 |
| T5 | not T4 | T3 | not T2 | T1 |
| T5 | not T4 | not T3 | not T2 | T1 |
| T5 | T4 | not T3 | not T2 | T1 |

FIG. 15 shows the RETE-net representation 140 for left hand side 26'''. Test nodes 144a-144e feed ten AND join nodes 146a-146j and twenty-eight NOT join nodes 148a-148bb to produce eleven output tokens representing the eleven possible instances of left-hand side 26'''.

In accordance with one aspect of the invention, the way in which RETE-net 36 represents meta tests (such as the test expressions in the left-hand sides of rules 4–6) is modified by creating new nodes which allow the occurrences of one or more conditions being tested by regular test nodes or join nodes in the RETE-net to be counted.

Referring to FIG. 16, in accordance with the invention, the left-hand side of "OR" rule 4 (FIG. 10), "at least" rule 5 (FIG. 12), and "at most" rule 6 (FIG. 14) can each be represented by a simple RETE-net 150 which includes new nodes in addition to the regular start node 152, test nodes 154a-154d, and join nodes 156a-156d. The new nodes are RELAY nodes 158a-158d and COUNTER node 160, which cause tokens to be applied by processor/controller 46 to a shared token memory table 200. Processor/controller 46 performs tests on the tokens stored in memory table 200 according to the meta test function 210. RELAY nodes 158a-158d and COUNTER node 160 are created by compiler 32 (FIG. 1) when expert system program 12 is compiled into inference engine 34.

Processor/controller 46 sends token $t_1$ from test node 154a to the left memories 52 (FIG. 3) of join nodes 156a-156d, and also passes token $t_1$ to COUNTER node 160 for use as an index for storage of complex tokens (from RELAY nodes 158a-158d via respective join nodes 156a-156d) in rows of shared memory table 200. The right memories 54 of join nodes 156a-156d receive tokens $t_2$-$t_5$ from test nodes 154b-154e, respectively. Processor/controller 46 produces complex tokens for memory table 200 by matching tokens in the left and right memories 52, 54 of join nodes 156a-156d in the same manner as described above. Each RELAY node (e.g., node 158a) identifies a column in shared memory table 200, and enables processor/controller 46 to send the complex tokens (e.g., token $t_2$-$t_1$) from join nodes 156aq-156d to the assigned column in table 200.

Referring to FIG. 17, the data structure 170 of RELAY nodes 158a-158d includes a field 172 that holds a pointer containing the address (191, FIG. 19) of counter node information 190 which is shared by RELAY nodes 158a-158d and COUNTER node 160. Field 173 holds a pointer that identifies the column in shared memory 200 to which tokens are sent from the RELAY node 158a-158d.

Referring to FIG. 18, the data structure 180 of COUNTER node 160 includes field 182 that contains the address 191 of the shared counter node information 100 (FIG. 19).

Referring to FIG. 19, the data structure 190 of the counter node information that is shared by RELAY nodes 158a-158d and COUNTER node 160 includes a field 192 that contains a pointer that identifies the location in memory 33 (FIG. 1) of the meta-test function of COUNTER node 160 (e.g., the "OR", "at least", or the "at most" expressions of rules 4–6). Field 193 contains the arguments (e.g., 1, 2, etc.) of the meta-test function. That is, for rule 5 (FIG. 12) the test pointer in field 192 indicates the location in the memory 33 of inference engine 34 where an "at least" test sequence resides, and the argument in field 193 provides the number (i.e., 2) of tests T2-T5 which must pass along with T1 for the left hand side of the rule to be satisfied.

Field 194 contains a pointer to the starting address of the shared token memory table 200 of complex tokens $t_2$-$t_1$, $t_3$-$t_1$, $t_4$-$t_1$, $t_5$-$t_1$ from RELAY nodes 158a-158d, respectively. Shared token memory table 200 is indexed by tokens $t_1$ from COUNTER node 160 in a manner discussed in detail below. Field 195 holds a pointer to a list of pointers that contain the addresses of the left memories 52 of successor nodes (not shown) in the RETE-net 36 for all of the rules in system 10. For purposes of illustration, RETE-net 150 is shown in FIG. 16 as having terminal node 162 as its only successor node. Thus, the address 91 of terminal node 162 (FIG. 7) is included in the list of pointers associated with field 195.

Referring to FIG. 20, shared token memory table 200 includes columns 202a-202d for complex tokens from join nodes 156a-156d, respectively, and identified in fields 173 of RELAY nodes 158a-158d, respectively. Thus, complex tokens $t_2$-$t_1$ representing instances of tests T2 and T1 passing in the combination (e.g., AND) represented by join node 156a are assigned to column 202a. Instances of tests T3 and T1 passing according to the function of join node 156b are represented by complex tokens $t_3$-$t_1$ assigned to column 202b. Column 202c is designated for complex tokens $t_4$-$t_1$, which represent instances of tests T4 and T1 passing in the combination tested by join node 156c. Complex tokens $t_5$-$t_1$, representing instances of tests T5 and T1 passing according to the function of join node 156d, are assigned to column 202d.

Because the left hand side of any one of meta test rules 4–6 is satisfied only if test T1 passes along with some combination of tests T2-T5 passing, and because several data elements 56 may possibly pass test T1, columns 202a-202d are indexed into rows 204a-204n according to tokens $t_1$ passed to COUNTER node 160 by test node 154a. Each row 204a-204n is associated with a token $t_1$ that identifies a data element (by the pointer in field 102, FIG. 8). Only complex tokens from join nodes 156a-156d and RELAY nodes 158a-158d that can be traced (via the lists of pointers associated with their data structure fields 112, FIG. 9) to that data element are eligible to be placed in that row 204a-204n.

Figure 21:
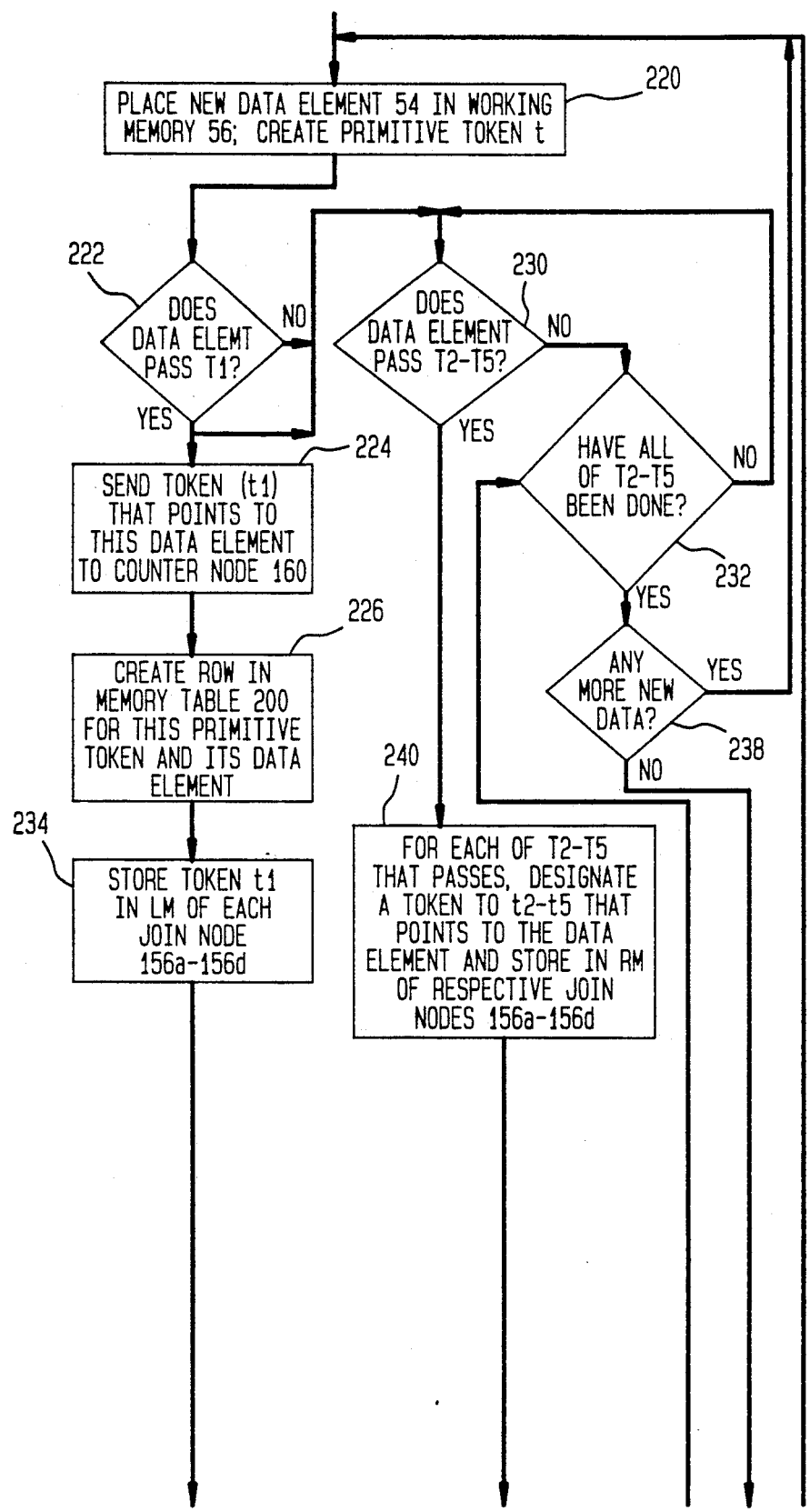
FIG. 21 is a flow chart illustrating the operation of the RETE-net of FIG. 16.

Referring to FIGS. 16, 20, and 21, in operation, assume that the left and right memories of join nodes 156a-156d and memory table 200 are initially empty. When a new data element 56 (e.g., data element A) is obtained by inference engine 34 (e.g., from the user or database 48, or as the result of a rule being fired), processor/controller 46 stores the data element in working memory 54, creates a primitive add token t(A) that points the storage location of data element A (FIG. 8), and applies the new token t(A) to start node 152 (220).

Processor/controller 46 then sends token t(A) from start node 152 sequentially to test nodes 154a-154e. Assume that data element A passes test T1 (222). Processor/controller 46 sends this add token $t_1$(A) from test node 154a to COUNTER node 160 (224). COUNTER node 160 creates row 204a in memory table 200 that is dedicated to complex tokens from join nodes 156a-156d (via RELAY nodes 158a-158d, respectively) that are associated with a $t_1$ token that points to data element A (226). Token $t_1$(A) is also stored in the left memories (LM) 52 of join nodes 156a-156d by processor/controller 46 (228).

COUNTER node 160 calls meta test function 210 each time that a new row (e.g., row 204a) is established in table 200. This is because some rules (e.g., "at most" rule 6) are satisfied as soon as test T1 is passed. If the rule is satisfied, processor/controller 46 marks the newly-created row "T" or true; otherwise, the row is marked "F" or false.

Regardless of whether data element A passes test T1, processor/controller 46 sequentially performs the tests identified by test nodes 154b-154e on data element A (230). The testing process continues until tests T2-T5 have all been run (232). Assume that data element A does not pass any of tests T2-T5. Then, no join node 156a-156d will have a match between tokens in its left and right memories 52, 54 (234) because the right memories 54 of join nodes 156a-156d are all empty. When all tests T1-T5 have been run (232) and all join nodes checked for matches (if one or more tests have passed) (236), processor/controller 46 can proceed no further with data element A, and checks whether any more new data elements 56 are available (238). This would also be done if data element A failed all tests T1-T5. If there are more available data elements 56, the process continues (220) for the next data element (e.g., data element B).

Assume that data element B (represented by primitive token t(B)) passes only test T4 (230). Processor/controller sends a primitive add token $t_4$(B) from test node 154a to the right memory 54 of join node 156c (240). Now, processor/controller 46 finds a match (234) at join node 156c between primitive add tokens $t_1$(A), $t_4$(B) in left and right memories 52, 54. Thus, processor/controller 46 generates a complex add token (FIG. 9) containing a pointer to a list of pointers 112 containing the addresses 101 (FIG. 8) of primitive tokens $t_4$(B) and $t_1$(A), and sends the complex token $t_4$(B)-$t_1$(A) to RELAY node 158c (242).

Complex token $t_4$(B)-$t_1$(A) indicates that tests T4 and T1 have been passed. Because RELAY node 158c has access to shared counter node information data structure 190 (via the pointer in field 172), processor/controller 46 determines that complex token $t_4$(B)-$t_1$(A) is to be placed in row 204a of memory table 200 (i.e., the row that is assigned to primitive token $t_1$(A)), and thus stores complex token $t_4$(B)-$t_1$(A) in row 204a of column 202c (i.e., the column assigned to RELAY node 158c, as identified by the pointer in field 173, FIG. 17) (244).

Memory row test function 210 is then called by RELAY node 158c to cause processor/controller 46 to perform the meta-test associated with test pointer 192 and test argument 193 on row 204a (because it is the only row to which a token has been just added) to determine whether the number of complex add tokens in columns 202a-202d of row 204a satisfy the meta-test (246). Suppose that rule 5 (FIG. 12) is being represented by RETE-net 150. Using test function 210, processor/controller 46 checks whether at least two of tests T2-T5 are passed along with a given instance of test T1 being passed by determining whether there are at least 2 columns 202a-202d in row 204a that contain complex add tokens (246). Because only one complex add token, token $t_4$(B)-$t_1$(A), is presently in row 204a, the left-hand side of rule 5 is not yet satisfied, and processor/controller 46 maintains row 204a marked "F" or false (FIG. 20).

It is possible that more than one primitive token was in the left memory of join node 156c when token $t_4$(B) was stored in the right memory, and thus successive complex tokens associated with token $t_4$(B) could be generated (248). If so, processor/controller 46 sends these complex tokens to RELAY node 158c (242), places in the proper column and row of memory 200 (244) and performs test function 210 on that row (246).

After all of the complex tokens from RELAY node 158c have been checked at memory table 200 (248), all of join nodes 156a-156d have been checked for token matches (236), and all tests T1-T5 have been run (232), processor/controller 46 repeats the inference process for the next data element, if any (238).

Assume that the next new data element, data element C, passes only test T1. Processor/controller 46 sends add token $t_1$(C) from test node 154a to COUNTER node 160, which creates row 204b in memory table 200 for the primitive token and data element C (226). Primitive token $t_1$(C) is also stored in the left memories of join nodes 156a-156d (228). A new token match occurs (234) in join node 156c, and processor/controller 46 sends a new complex add token $t_4$(B)-$t_1$(C) to RELAY node 158c (242).

Because the $t_1$ portion of complex token $t_4$(B)-$t_1$(C) is associated with data element C (and not, e.g., element A), complex token $t_4$(B)-$t_1$(C) is sent from RELAY node 158c to in row 204b, column 202c of memory table 200 (244). This row 204b does not yet satisfy the "at least 2" test of test function 210 (246), however, and row 204b is maintained marked "F" or false. The inference process is then repeated for a new data element 56, if any (238).

Suppose that the next new data element, data element D, passes only test T2 (230). Processor/controller 46 sends add token $t_2$(D) from test node 154b to the right memories 54 of join nodes 156a-156d (240). A match is thus made between token $t_2$(D) and token $t_1$(A), and a complex add token $t_2(D)$-$t_1(A)$ is sent by processor/controller 46 to RELAY node 158a (242).

Because the $t_1$ portion of complex token $t_2(D)$-$t_1(A)$ is associated with data element A, processor/controller 46 sends the complex add token from RELAY node 158a to row 204a of column 202a in memory table 200 (244). Now, test function 210 is satisfied (246), because there are complex add tokens in at least two columns of row 204a. That is, data elements A, B, and D have resulted in an instance of the left-hand side of rule 5 being satisfied. Row 204a is changed from "F" to "T" or true, and processor/controller 46 generates a new complex token (FIG. 9) which contains, in field 112, a pointer to the address 181 of COUNTER node 160 (FIG. 18) and a pointer to the address 101 of primitive token $t_1(A)$ (250). This new complex token $t_c$-$t_1(A)$ is stored in terminal node 162 (252) (and possibly sent elsewhere in RETE-net 36 of all rules).

Another match between primitive add tokens is present at join node 156a, i.e., a match between tokens $t_2(D)$ and $t_1(C)$ (248, 234). Thus, processor/controller 46 sends complex add token $t_2(D)$-$t_1(C)$ to RELAY node 158a (242), and stores the token in column 202a of memory table 200 at the row 204b associated with $t_1(C)$ (244). Complex add tokens are now present in at least two columns of row 204b (246), and thus another instance of the left hand side of rule 5 is satisfied and must be dealt with. Processor/controller 46 changes the true/false condition of row 204b from "F" to "T" or true and generates a new complex token $t_c$-$t_1(C)$ (250) which is stored in terminal node 162 (252).

Because an instance of "at least 2" rule 5, for example, occurs when any two columns 202a-202d of a given row 204a-204n of memory table 200 contain complex add tokens, additional instances of the rule should not occur when a third or fourth complex add token is placed in that row. Thus, whenever processor/controller 46 determines (based on test function 210) that a row (e.g., row 204a) has passed due to the addition of an add token to a column of that row, it checks whether the true/false (T/F) condition of that row is changed (249). If not (i.e., if the row had previously satisfied test function 210), processor/controller 46 does not generate a new complex add token (representing a new rule instance), and the process proceeds to step 248.

However, if a complex delete token is sent by processor/controller 46 via a RELAY node 158a-158d to remove a corresponding complex add token from a column of a row of memory table 200, and if as a result the T/F condition of that row changes (249) from true to false (i.e., test function 210 is no longer satisfied for that row), processor/controller 46 generates a complex delete token (250). The complex delete token also points to the address 181 of COUNTER node 160 and to the address 101 of the primitive token associated with that row (e.g., primitive token $t_1(A)$ for row 204a). This complex token is sent by processor/controller 46 to terminal node 162 (252).

After add and delete tokens for all new data elements have been applied to RETE-net 150 (238), processor/controller 46 checks terminal node 162 for the presence of complex add tokens (254). If terminal node 162 is empty, no instances of rule 5 are ready to fire and execution of expert system program 12 is complete (256), at least for all of the data that has been obtained by inference engine 34 so far.

In the present example, however, two instances of rule 5 are ready to fire, as indicated by the presence of add tokens $t_c$-$t_1(A)$ and $t_c$-$t_1(C)$ in terminal node 162. Processor/controller 46 performs conflict resolution between the two instances, using information found in fields 114 (FIG. 9) of the data structures 110 of the tokens, and fires the winning rule instance, e.g., the instance represented by token $t_c$-$t_1(A)$ (258). Of course, had only one double token been stored in terminal node 162, there would have been no conflict, and processor/controller 46 would simply fire the rule instance represented by that token.

If the firing of a rule instance causes more data to be generated or obtained (260) by inference engine 34, processor/controller 46 repeats the inference process starting at step (220) for each new data element. If no new data is generated or obtained, operation is complete (256).

The importance of indexing memory table 200 by rows assigned to individual data tokens (e.g., tokens for data elements A and C) that have passed test T1 is apparent when one or more of join nodes 156a-156d identify tests on data elements as a condition for matching tokens in left memories 52 with tokens in right memories 54. For example, consider that join node 156c, besides identifying a logical AND function between tokens in left memory 52 and tokens in right memory 54, also identifies a test (via field 84, FIG. 6) that specifies that a data element associated with a left memory token must have a value greater than the value of a data element associated with a right memory token in order for a match to occur. Assume further that data element A is not greater than data element B, but data element C is greater than data element B.

In this case, processor/controller 46 would not find a match between tokens $t_1(A)$ and $t_4(B)$ at join node 156c, but a match between tokens $t_1(C)$, $t_4(B)$ would still be found. With memory table 200 indexed by rows 204a, 204b assigned to tokens $t_1(A)$, $t_1(C)$, respectively, processor/controller 46 is able to correctly send complex token $t_4(B)$-$t_1(C)$ (via RELAY node 158c) to row 204b instead of row 204a. This correctly indicates that an instance of the left-hand side of rule 5 being satisfied has occurred with data element C, but not with data element A.

RETE-net 150 can represent a wide variety of meta tests by identifying the appropriate test (field 192, FIG. 19) and test arguments (field 193) of test function 210.

For example, referring also to FIG. 10, "OR" rule 4 can also be implemented with RETE-net 150. The test arguments (field 193, FIG. 19) are simply set to 1. Thus, the execution of test function 210 will cause a complex token to be sent to terminal node 162 for a given row 202a-202n of memory table 200 whenever one complex add token is stored in that row and causes the T/F condition of the row to change.

Referring also to FIG. 14, RETE-net 150 can also represent the left-hand side of "at most 2" rule 6. The test pointer (field 192) and test arguments (field 193) are selected so that test function 210 is satisfied if, for a given row in memory table 200, zero, one or two complex tokens are present in columns 202a-202d. However, no token is sent to terminal node 162 for a row if three or more complex tokens are stored in that row.

Using this scheme, RETE-net 150 can implement many other combinations of an arbitrary number of tests, for example, determining whether greater than X but fewer than Y tests have been passed, or determining whether between X and Y tests have been passed. Still another example is checking whether an odd or even number of tests have been passed, or whether a specific combination of tests (i.e., the first, third, and fourth tests) have passed.

Referring again to FIG. 16, RETE-net 150 can also represent rule left-hand sides that do not contain an indexing test (i.e., a test, like T1 of rules 4–6, that must pass along with the meta-test of tests T2–T5). Consider, for example, rule 5' that has a left hand side that is satisfied simply if any two of tests T2, T3, T4 or T5 pass. Compiler 32 (FIG. 1) recognizes such a non-indexed meta-test and creates a special test node (154a) which applies tokens to COUNTER node 160. Compiler 32 establishes test nodes 154b–154e for tests T2–T5, respectively, and arranges the remainder of RETE-net 150 as shown in FIG. 16.

Compiler 32 also creates a special data element that has only one allowed value and which is capable of passing only the special test of node 154a. The creation of the special test node and data element is invisible to the programmer (i.e., the author of the non-indexed meta-test rule).

When operation commences, processor/controller 46 sends the token associated with the special data element to RETE-net 150, and the special data element passes the only special test of node 154a. This causes COUNTER node 160 to establish a row in memory table 200 that is assigned to the token from node 154a. The special token is matched in join nodes 156a–156d with any token from respective test nodes 154b–154e, and complex tokens that identify the special token are sent to RELAY nodes 158a–158d. The complex tokens from RELAY nodes 158a–158d are placed in columns 202a–202d (FIG. 20) of the row in memory table 200 that is identified by the special token from COUNTER node 160. Processor/controller 46 performs test function 210 on this row in the same manner as described above.

Referring again to FIG. 1, occasionally during the operation of expert system 10, none of the left-hand sides of the rules represented by RETE-net 36 will be satisfied after tokens for all available data elements 56 have been applied to RETE-net 36, and thus no rule can be fired. One possibility is that no data values have been obtained for one or more categories of data definitions 14 (i.e., data for each such category is missing). In accordance with another aspect of the invention, a mechanism is provided by which the data definition category corresponding to the missing data can be efficiently identified on demand.

Referring also to FIG. 22, data definitions 14 in expert system program 12 include one or more data categories (e.g., name, age, height, weight) and, for each category, an initial data value and a set of values that the data is allowed to have. For example, height is initially set to "Y" and is permitted to have a value that is less than 100. In the invention, the data definition categories which will be subject to on-demand data gathering (e.g., "age") are selected and assigned an initial value, "<unasked>". If during the execution of expert system program 12 data elements having allowed values are obtained for <unasked> data definitions, then, of course, data for these categories will not be "missing", and the initial <unasked> value will be overwritten by the allowed values that are obtained.

Referring to FIGS. 23 and 24, compiler 32 recognizes tests that deal with <unasked> data definitions and structures these tests to perform a test for the <unasked> value if the primary function of the test fails.

For example, the left-hand side 270 of rule 7 (FIG. 23) includes a test T1 that checks whether age=7, and a test T2, which tests if height is less than 60. In the invention, compiler 32 compiles left-hand side 270 as if it were the left hand side 270' (FIG. 24) of a rule 7' in which test T1', if the value of age is not equal to 7, asks whether age has the value <unasked>. If so, test T1' passes. Because height is not an <unasked> data definition, test T2 is not changed.

Thus, if no data has been obtained by processor/controller 46 for age, the portion of left-hand side 270' dealing with T1' is nevertheless satisfied, because age equals its initialized value of <unasked>. However, if some data had been obtained for age so that age has some value (e.g., 6) not equal to 7, test T1' would fail, because <unasked> has been overwritten with the value "6". The portion of left hand side 270' dealing with T2 is not satisfied unless height is less than 60.

Compiler 32 also changes the action list 271 (FIG. 23) of rule 7 to an action list 271' that, if rule 7 passes because age data is missing, causes processor/controller 46 to initiate a data gathering sequence for age in place of firing the rule, as described in detail below.

Figure 25:
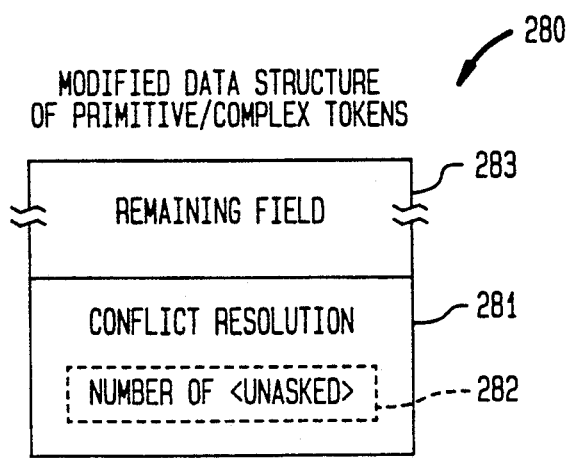
FIG. 25 is a diagram of the data structures of primitive and complex tokens, modified according to the second aspect of the invention.

Referring to FIG. 25, processor/controller 46 changes the data structures 280 of both primitive and complex tokens to keep track of the number of tests associated with each token that have passed because data is missing for a data definition that has an <unasked> initial value. Specifically, the conflict resolution fields 281 of all primitive and complex tokens are augmented with a counter 282 that keeps track of the number of tests that have passed despite data being missing for <unasked> data definitions. The remaining fields 283 of the primitive and complex token data structures 280 are unchanged.

The changes made by compiler 32 to the rule left-hand sides to check for <unasked> data definitions, and the alterations of the data structures of tokens by processor/controller 46 to include counter 282 are completely invisible to the programmer.

Figure 26:
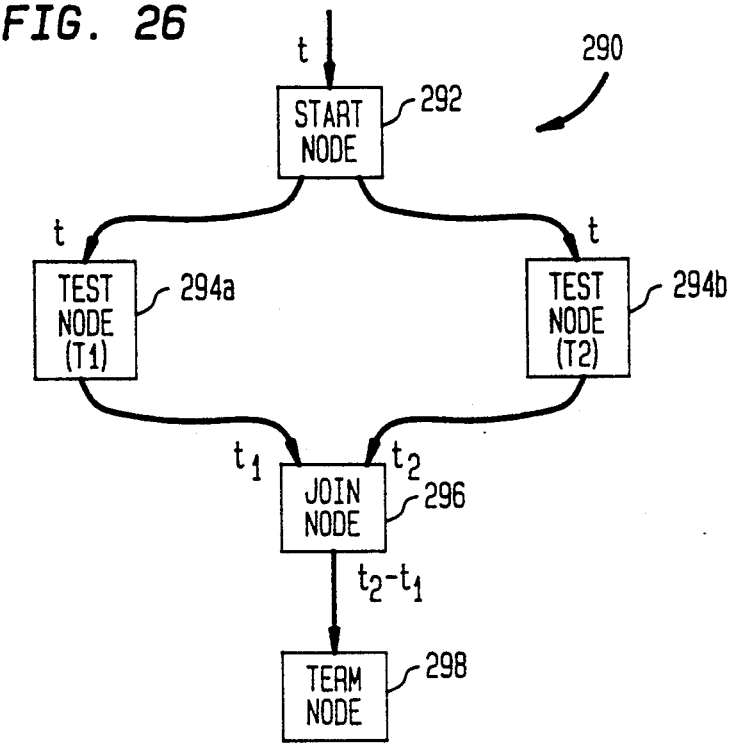
FIG. 26 is a diagram of a RETE-net for the rule of FIGS. 23 and 24.

Referring to FIG. 26, left-hand side 270' of rule 7' is represented by RETE-net 290, with primitive tokens t being sent from processor/controller 46 from start node 292 to a pair of test nodes 294a, 294b that identify tests T1' and T2, respectively. As data elements pass tests T1' and T2, processor/controller 46 sends primitive tokens $t_1$, $t_2$ respectively, to the left memory and the right memory, respectively, of join node 296. Processor/controller 46 checks for matches between left and right memory primitive tokens at join node 296 and sends complex tokens $t_2$-$t_1$ representing successful matches to terminal node 298.

Processor/controller 46 applies each primitive token t to RETE-net 290 with its <unasked> counter 282 initialized to zero. Processor/controller 46 increments the <unasked> count of the primitive token t at test node 294a only if the test for the <unasked> value is both performed and passed.

The amount by which <unasked> counter 282 is incremented depends on the number of data definitions in the data element 56 represented by token t that are tested and that have <unasked> values. For example, if a data element represented by token t includes only one data definition that has an <unasked> value that is tested (and passed) at node 294a, the <unasked> counter 282 of token t is incremented by one. On the other hand, if the data element includes four data definitions (e.g., age, height, weight, and sex) that are all tested at node 294a, and the data element itself is set to the <unasked> value, then processor/controller 46 will increment the <unasked> counter 282 of the token t representing this data element by four when it sends the token to join node 296.

The contents of <unasked> counter 282 in a complex token $t_2-t_1$ created by join node 296 is the sum of the contents of the <unasked> counters 282 of the tokens $t_1$, $t_2$ that are matched to form the complex token.

Figure 27A:
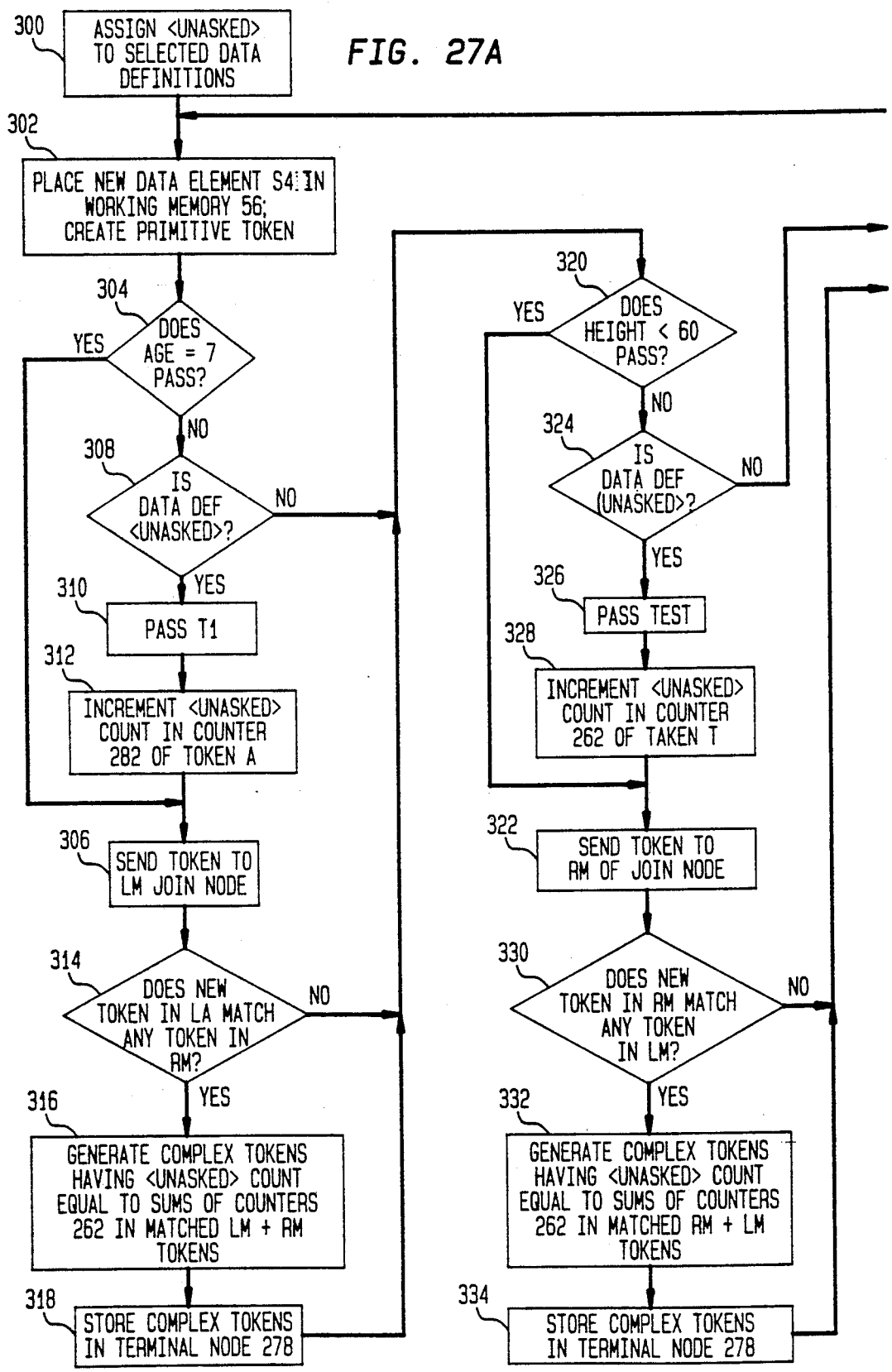
FIGS. 27 and 28 are flow charts useful in understanding the operation of the second aspect of the invention.
Figure 27B:
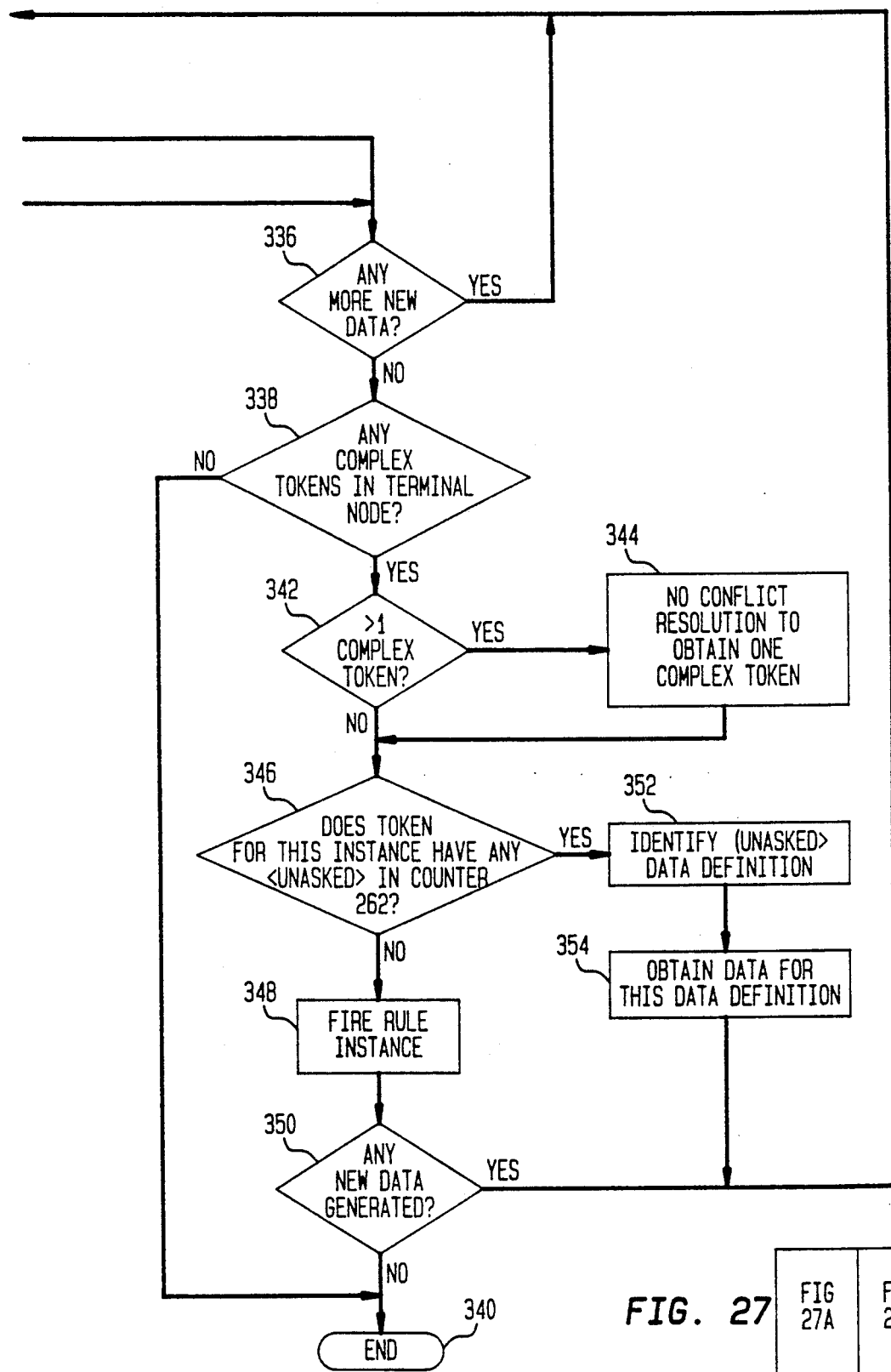
Figure 27:
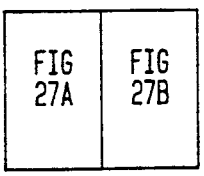

Referring also to FIG. 27, in operation, with the value <unasked> being assigned in advance (300) to one or more data definitions (e.g., to "age", FIG. 22), processor/controller 46 places each new data element 56 that it obtains in working memory 54, and creates a token t for it (302). Processor/controller 46 sends token t to test node 294a, and checks whether the value of the new data element passes the test age=7 (304). If so, token $t_1$ is sent by processor/controller 46 to the left memory of join node 296 (306).

If the value of the new data element does not pass the test for age equal to 7, processor/controller 46 checks whether the value of the data definition "age" equals <unasked> (308). Assuming that no data has yet been obtained for age, the value of the data definition will equal <unasked>, satisfying test T1' (310). Before token $t_1$ is sent to join node 296, processor/controller 46 increments the <unasked> counter 282 of token $t_1$ to a count of "1" (312).

At join node 296 processor/controller 46 checks whether one or more matches exist between the new token $t_1$ in left memory (LM) 52 and any $t_2$ tokens that currently reside in right memory (RM) (314). If so, processor/controller 46 generates a complex token or tokens $t_2-t_1$, each of which has an <unasked> count in counter 282 equal to the sum of the <unasked> counters 282 of primitive tokens $t_1$, $t_2$ that were matched (316). Each new complex token is then sent by processor/controller 46 to terminal node 298 (318).

Note that if a join node represents a function other than a logical AND (e.g., a NOT function, or a test of whether the value of the data element associated with one token is, e.g., greater than that associated with another token), the function associated with the join node is slightly changed. Test functions (e.g., "greater than" tests) are changed to indicate that the test is passed if it involves a data definition that is <unasked> and for which data is missing. Similarly, the NOT function is altered to ignore tokens that have non-zero <unasked> counts when applying the NOT function. This prevents a failure being inadvertently indicated by the NOT function simply because a data definition is <unasked>.

Referring again to FIG. 27, token t is also sent to test node 294b, and test T2 (i.e., height <60) is performed on the associated data element (320). Assume that the new data element passes T2 (but did not pass T1). Processor/controller 46 sends token $t_2$ to the right memory (RM) of join node 296 (322). Had test T2 not passed, the next step would be to apply the next data element, if any (336), to RETE-net 290, because height is not <unasked> (324). (But if height was <unasked>, the test would pass (326) and the <unasked> count of token $t_2$ would be incremented (328) from zero.)

Processor/controller 46 performs a logical AND function (according to left-hand side 271' of rule 7') to check for a match between the new $t_2$ token and any $t_1$ token that currently resides in the left memory (LM) of join node 296 (330). In this example, a match will be found, and processor/controller 46 generates a complex token $t_2-t_1$ that has a value of "1" in its <unasked> counter 282, because token $t_1$ was sent (306) to join node 296 as the result of age being <unasked> (332). The new complex token $t_2-t_1$ is stored by processor/controller 46 in terminal node 298 (334).

If there are any additional new data elements (336) they are obtained and applied one at a time by processor/controller 46 to RETE-net 290 in the manner described above. When all new data elements have been applied to the RETE-net, processor/controller 46 checks all of the terminal nodes in the RETE-net (e.g., node 298) for the presence of complex tokens (338). If none are found, no rule left-hand side is satisfied, and the process terminates (340).

On the other hand, if more than one complex token is found (either in one terminal node or in multiple terminal nodes) (342), processor/controller 46 performs conflict resolution between the complex tokens to obtain a single complex token with which to proceed (344). However, no conflict resolution is needed if only one complex token is found in the terminal nodes.

Figure 28:
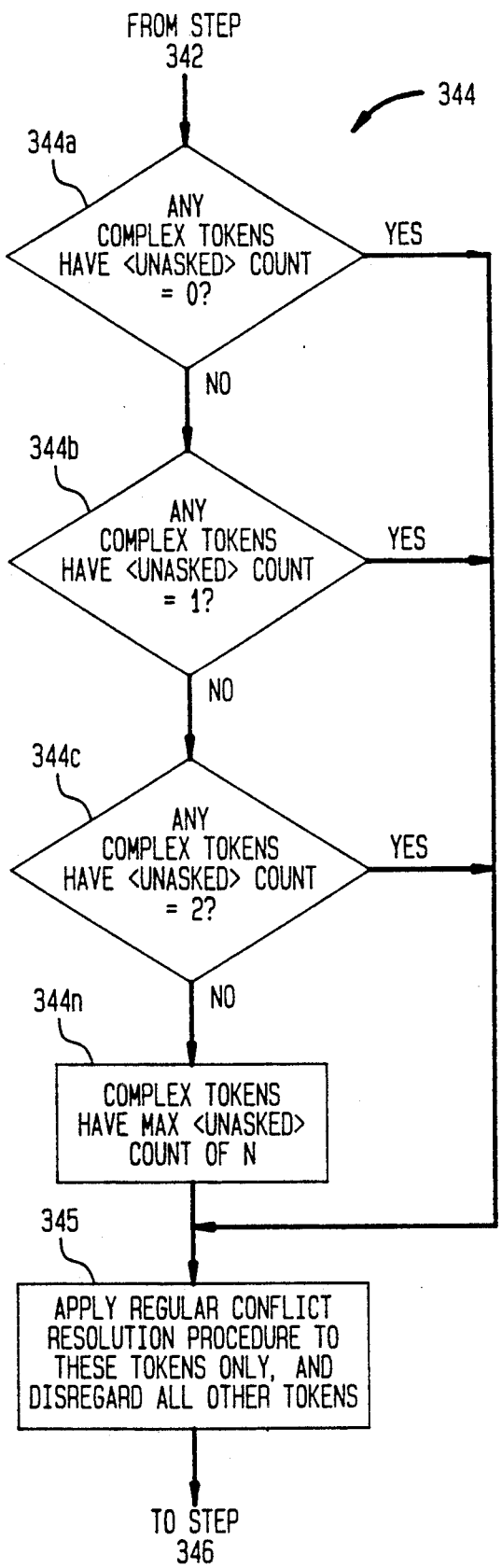

Referring also to FIG. 28, conflict resolution (344) is performed on the complex tokens in an order of preference determined by the <unasked> count 282 of the complex tokens. Tokens having an <unasked> count of 0 have priority (344a) over tokens with an <unasked> count of 1, which in turn have priority (344b) over tokens having an <unasked> count of 2 (344c). The lowest priority complex tokens are those with the maximum possible <unasked> count (i.e., N) (344n), which is related to the highest number of tests contained in the left-hand side of any rule. As a result, the regular conflict resolution procedure is performed on the complex tokens associated with the fewest number of <unasked> data definitions 14 for which data is missing (345). Thus, rules that have their left-hand sides satisfied without having to rely on a data definition being <unasked> are not inadvertently superceded by rules that have left-hand sides that are satisfied because data values are missing for one or more <unasked> data definitions.

Referring to FIG. 27, if the complex token that is selected by the conflict resolution procedure has an <unasked> count of zero (346), processor/controller 46 fires the instance of the rule whose left-hand side is associated with the terminal node that contains that complex token (348). This is because that complex token represents an instance in which the left-hand side of that rule is satisfied by actual values of data elements 56 stored in working memory 54. That is, none of the tests in the left-hand side of the rule has passed as the result of data being missing for one or more <unasked> data definitions. If any new data is generated from the firing of the rule (350), that data is obtained and applied to RETE-net 290 in the same manner as described above. Otherwise, the procedure terminates (340).

If, however, the complex token that is selected by conflict resolution (344) has an <unasked> count of 1 or more, the rule associated with the complex token is not fired, because data values of one or more data elements associated with the token are missing. Thus, while the left-hand side of the rule is satisfied, the rule is not ready to be fired, because one or more pieces of data are missing.

Referring also to FIG. 9, processor/controller 46 identifies the <unasked> data definition or data definitions for which data is missing by following the pointers in field 112 of the complex token back to the addresses 101 of the primitive tokens from which the complex token is formed. The first primitive token in this list that has an <unasked> counter that contains a value of 1 is selected. The pointer in field 102 (FIG. 8) of that primitive token is traced to the working memory location of its data element (which has the value <unasked>), from which an <unasked> data definition that was tested to produce this primitive token is identified (352).

Because a data element can contain more than one data definition, more than one of which can have a value of <unasked>, the first data definition in the data element that has an <unasked> value is identified. If the data element itself is set to a value of <unasked>, the first data definition in the data element is identified.

Once an <unasked> data definition has been identified, missing data for this definition can be obtained (354) in a number of ways. For example, processor/controller 46 can simply identify the data definition to the user and wait for the user to enter the missing data. Alternatively, processor/controller 46 may run one of the other programs 18 (FIG. 1) to calculate the missing data.

Once the missing data is obtained, processor/controller 46 loads it into working memory 54 as one or more data elements 56, for which new primitive add tokens are created (302). A delete token for the previous value <unasked> of the data definition is applied to RETE-net 190, followed by the add tokens which represent the obtained data values.

Other embodiments are within the following claims. For example, referring to FIGS. 16, 20, and 21, memory table 200 can alternatively be indexed (via COUNTER node 160) by complex tokens rather than by primitive tokens.

We claim:

1. A method for evaluating an expression comprising conditions for a plurality of categories of data definitions in a network, the network comprising a plurality of first type of nodes each representing one of the conditions and at least one second type of node, the plurality of first type of nodes and the at least one second type of node being coupled in such a manner to represent the relationship of the conditions in the expression, comprising the steps of:
   (a) assigning a predetermined value to preselected categories of the plurality of categories of data definitions which will provisionally satisfy conditions in the expression that require values of data from one of the preselected categories to be satisfied;
   (b) creating a token representative of a data element, the token having a counter associated therewith;
   (c) passing the token to at least one of the plurality of first type of nodes;
   (d) processing the token in the at least one of the plurality of first type of nodes to determine if the condition is satisfied;
   (e) when the condition is satisfied, passing the token to a next one of the plurality of first type of nodes and the at least one of the second type of node which is coupled to the output of the at least one of the plurality of first type of nodes;
   (f) when the condition is not satisfied, further processing the token in the at least one of the plurality of first type of nodes to determine if the value of the data definition tested by the condition has been assigned a predetermined value to provisionally satisfy the condition;
   (g) when the condition is provisionally satisfied,
      (i) incrementing the counter to indicate that the condition is provisionally satisfied since the value of the data definition has been assigned a predetermined value, and
      (ii) passing the token to a next one of the plurality of first type of nodes and the at least one of the second type of node which is coupled to the output of the at least one of the plurality of first type of nodes;
   (h) repeating steps (d)-(g) until a predetermined combination of the plurality of first type of nodes indicate that the conditions represented by the plurality of first type of nodes are satisfied or are provisionally satisfied, then passing the token to the at least one of the second type of node; and
   (i) repeating steps (b)-(h) for all additional data elements which are to be applied to the network.

2. A method for evaluating an expression according to claim 1, further comprising the steps of:
   (a) if more than one token is passed to the at least one of the second type of node, performing a conflict resolution scheme to process the tokens in a priority order based upon the value stored in the counter of each token;
   (b) for tokens having no indication stored in its associated counter that a condition is provisionally satisfied, executing a procedure which is part of the expression represented by the nodes in the network; and
   (c) for tokens having an indication stored in their associated counters that a condition is provisionally satisfied,
      (i) identifying the preselected categories of the plurality of categories of data definitions which were assigned predetermined values, and
      (ii) obtaining data for the data definitions that were assigned predetermined values to satisfy the conditions of the network.

3. A method for evaluating an expression according to claim 1, wherein the step of processing the token further comprises the steps of:
   (a) maintaining the predetermined value for the preselected categories of the plurality of categories of data definitions until a value belonging to the category has been processed by the network; and
   (b) overwriting the predetermined value for the preselected categories of the plurality of categories of data definitions with the value belonging to the category processed by the network.

4. A method for evaluating an expression according to claim 1, wherein the expression is deemed to have been satisfied if a predetermined combination of the plurality of first type of nodes indicate that the conditions represented by the nodes are satisfied or are provisionally satisfied, further comprising the step of identifying the number of the conditions that are indicated to be provisionally satisfied when the expression of conditions is satisfied by examining the counter associated with each token.

5. A method for evaluating an expression according to claim 4 wherein the expression is associated with a rule, further comprising the step of firing the rule if the number of conditions that are indicated to be provisionally satisfied is zero.

6. A method for evaluating an expression according to claim 1 wherein there are a plurality of expressions, each expression being satisfied when a predetermined combination of the nodes indicate that the conditions in the expression are satisfied or are provisionally satisfied, further comprising the step of identifying the number of the conditions that are indicated to be provisionally satisfied for each satisfied expression.

7. A method for evaluating an expression according to claim 6 further comprising the step of determining priority between the satisfied expressions based on the number of conditions that are indicated to be provisionally satisfied for each the satisfied expression.

8. A method for evaluating an expression according to claim 7 wherein the plurality of expressions are respectively associated with a plurality of rules, further comprising the step of selecting one of the plurality of rules based on the priority determination.

9. A method for evaluating an expression according to claim 8 further comprising the step of firing the selected one of the plurality of rules if the number of conditions that are indicated to be provisionally satisfied for the satisfied expression that is associated with that rule equals zero.

10. A method for evaluating an expression according to claim 9, further comprising the steps of
   (a) selecting the identified category of data for which conditions represented by the plurality of first type of nodes were provisionally satisfied; and
   (b) obtaining a value for the selected category of data if the number of conditions that are indicated to be provisionally satisfied for the satisfied expression that is associated with the rule is greater than zero.

11. A method for operating a computer to evaluate an expression comprising conditions for a plurality of categories of data definitions, the computer including a network comprising a plurality of first type of nodes each representing one of the conditions and at least one second type of node, the plurality of first type of nodes and the at least one second type of node being coupled in such a manner to represent the relationship of the conditions in the expression, comprising the steps of:
   (a) assigning a predetermined value to preselected categories of the plurality of categories of data definitions which will provisionally satisfy conditions in the expression that require values of data from one of the preselected categories to be satisfied;
   (b) creating a token representative of a data element, the token having a counter associated therewith;
   (c) passing the token to at least one of the plurality of first type of nodes;
   (d) processing the token in the at least at one of the plurality of first type of nodes to determine if the condition is satisfied;
   (e) when the condition is satisfied, passing the token to a next one of the plurality of first type of nodes and the at least one of the second type of node which is coupled to the output of the at least one of the plurality of first type of nodes;
   (f) when the condition is not satisfied, further processing the token in the at least one of the plurality of first type of nodes to determine if the value of the data definition tested by the condition has been assigned a predetermined value to provisionally satisfy the condition;
   (g) when the condition is provisionally satisfied,
      (i) incrementing the counter to indicate that the condition is provisionally satisfied since the value of the data definition has been assigned a predetermined value, and
      (ii) passing the token to a next one of the plurality of first type of nodes and the at least one of the second type of node which is coupled to the output of the at least one of the plurality of first type of nodes;
   (h) repeating steps (d)-(g) until a predetermined combination of the plurality of first type of nodes indicate that the conditions represented by the plurality of first type of nodes are satisfied or are provisionally satisfied, then passing the token to the at least one of the second type of node; and
   (i) repeating steps (b)-(h) for all additional data elements which are to be applied to the network.

12. A method for operating a computer according to claim 11, further comprising the steps of:
   (a) performing a conflict resolution scheme to process the tokens in a priority order based upon the value stored in the counter of each token if more than one token is passed to the at least one of the second type of node;
   (b) for tokens having no indication stored in its associated counter that a condition is provisionally satisfied, executing a procedure which is part of the expression represented by the nodes in the network; and
   (c) for tokens having an indication stored in their associated counters that a condition is provisionally satisfied,
      (i) identifying the preselected categories of the plurality of categories of data definitions which were assigned predetermined values, and
      (ii) obtaining data for the data definitions that were assigned predetermined values to satisfy the conditions of the network.

13. A method for operating a computer according to claim 11 wherein the network comprises a reticular discrimination network.

14. A computer system comprising:
   a network for evaluating an expression comprising conditions for a plurality of categories of data definitions in which the evaluation of the expression is based upon data elements presented to said network, said network comprising a plurality of nodes each representing one of the conditions, the plurality of nodes being coupled in such a manner to represent the relationship of the conditions in the expression;
   a processor coupled to said network for passing values of data elements to said network and evaluating the expression for each one of the values of data elements passed through said network;
   at least one of the plurality of nodes being arranged to be provisionally satisfied when processing data elements which do not include values of data that are needed to satisfy the condition of the at least one of the plurality of nodes by assigning a predetermined value to preselected categories of the plurality of categories of data definitions.

15. A computer system according to claim 14 further comprising means for causing the at least one of the plurality of nodes to store an indication that the condition associated with the at least one of the plurality of nodes is provisionally satisfied.

16. A computer system according to claim 15 further comprising at least one second type of node coupled to the plurality of first type of nodes in such a manner to represent the relationship of the conditions in the expression.

17. A computer system according to claim 16 wherein said processor further comprises:
- means for creating a token representative of a data element, the token including storage for the means for causing the at least one of the plurality of nodes to store an indication that the condition associated with the at least one of the plurality of nodes is provisionally satisfied to store the indication;
- means for passing the token to at least one of the plurality of first type of nodes; and
- means for passing the token from one of the plurality of nodes to a next one of the plurality of nodes and the at least one of the second type of node.

18. A computer system according to claim 17 wherein said processor further comprises
- means for performing a conflict resolution scheme to process the tokens in a priority order based upon the value stored in the storage associated with each token if more than one token is passed to the at least one of the second type of node;
- means for executing a procedure which is part of the expression represented by the nodes in said network for tokens having no indication stored in its associated storage that a condition is not satisfied and the value of the data definition has been assigned a predetermined value;
- means for identifying the preselected categories of the plurality of categories of data definitions which were assigned predetermined values; and
- means for obtaining data for the data definitions that were assigned predetermined values to satisfy the conditions of said network for tokens having an indication stored in their associated storage that a condition is provisionally satisfied and the value of the data definition has been assigned a predetermined value.

19. A computer system according to claim 14 further comprising memory for maintaining said network, said memory being coupled to said processor.

20. A computer system according to claim 14 wherein said network is a reticular discrimination network.

* * * * *